(12) United States Patent
Tinsley

(10) Patent No.: US 10,098,293 B2
(45) Date of Patent: *Oct. 16, 2018

(54) PLANT GROWING HEAVY WEIGHT BEARING SUPPORT ASSEMBLY AND APPARATUS

(71) Applicant: Michael Robert Tinsley, Coral Springs, FL (US)

(72) Inventor: Michael Robert Tinsley, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,169

(22) Filed: Sep. 27, 2017

(65) Prior Publication Data

US 2018/0014487 A1 Jan. 18, 2018

Related U.S. Application Data

(63) Continuation-in-part of application No. 15/218,659, filed on Jul. 25, 2016, which is a continuation of application No. 14/814,788, filed on Jul. 31, 2015, now Pat. No. 9,456,689.

(60) Provisional application No. 62/193,767, filed on Jul. 17, 2015.

(51) Int. Cl.
*A01G 31/06* (2006.01)
*A01G 9/12* (2006.01)

(52) U.S. Cl.
CPC .............. *A01G 31/06* (2013.01); *A01G 9/12* (2013.01); *Y02P 60/216* (2015.11)

(58) Field of Classification Search
CPC ......... A01G 31/06; A01G 9/12; Y02P 60/216; A47B 57/06; A47B 57/26; A47B 57/265; A47B 57/30; A47B 57/54; A47B 57/545; A47B 96/02; A47B 96/024; A47B 47/00
USPC ........................ 211/187; 108/180, 182, 186, 108/147.12–147.15
See application file for complete search history.

(56) References Cited

U.S. PATENT DOCUMENTS

| | | | | |
|---|---|---|---|---|
| 176,512 A | * | 4/1876 | Chinnery | A47B 43/006 108/149 |
| 4,593,826 A | * | 6/1986 | Bustos | A47B 57/265 108/147.12 |
| 4,706,576 A | * | 11/1987 | James | A47B 57/545 108/106 |
| 4,815,394 A | * | 3/1989 | Ettlinger | A47B 57/265 108/107 |
| 5,695,081 A | * | 12/1997 | Alkalay | A47B 47/04 108/147.12 |

(Continued)

*Primary Examiner* — Brent W Herring
(74) *Attorney, Agent, or Firm* — Glenn E. Gold, P.A.; Glenn E. Gold

(57) ABSTRACT

A plant growing apparatus includes a support assembly and a height control mechanism. The support assembly includes a plurality of platforms, a plurality of elongated posts spaced apart from one another about the plurality of platforms, and a plurality of support clips selectively attachable to the posts to support selected platforms at different heights along the posts. The plurality of platforms include a bottom platform supporting lower ends of the posts, a top platform supported on upper ends of the posts, and upper and lower platforms movable along the posts toward and away from the top and bottom platforms. The height control mechanism is mounted by the top platform and coupled to the upper platform such that it operates to selectively raise or lower the upper platform along the posts.

20 Claims, 26 Drawing Sheets

(56) References Cited

U.S. PATENT DOCUMENTS

| | | | |
|---|---|---|---|
| 8,042,477 B2* | 10/2011 | Lee | A47B 57/54 108/109 |
| 8,074,583 B2* | 12/2011 | Lee | A47B 57/54 108/147.13 |
| 8,616,388 B2* | 12/2013 | Butler | A47B 43/00 108/106 |
| 8,950,602 B2* | 2/2015 | Fanourgiakis | A47B 45/00 108/102 |
| 9,386,846 B2* | 7/2016 | Fanourgiakis | A47B 45/00 |
| 9,456,689 B1* | 10/2016 | Tinsley | A01G 31/06 |
| 9,844,262 B2* | 12/2017 | Fanourgiakis | A47B 45/00 |
| 2008/0121600 A1* | 5/2008 | Korte | A47B 31/00 211/187 |
| 2009/0184078 A1* | 7/2009 | Lee | A47B 57/54 211/187 |
| 2011/0220602 A1* | 9/2011 | Chen | A47B 57/12 211/153 |
| 2012/0060416 A1* | 3/2012 | Brusatore | A01G 31/06 47/62 A |
| 2012/0312766 A1* | 12/2012 | Butler | A47B 43/00 211/134 |
| 2013/0193098 A1* | 8/2013 | Fanourgiakis | A47B 45/00 211/134 |
| 2014/0334135 A1* | 11/2014 | Fanourgiakis | A47B 45/00 362/127 |
| 2016/0316906 A1* | 11/2016 | Fanourgiakis | A47B 45/00 |
| 2017/0013794 A1* | 1/2017 | Tinsley | A01G 31/06 |

* cited by examiner

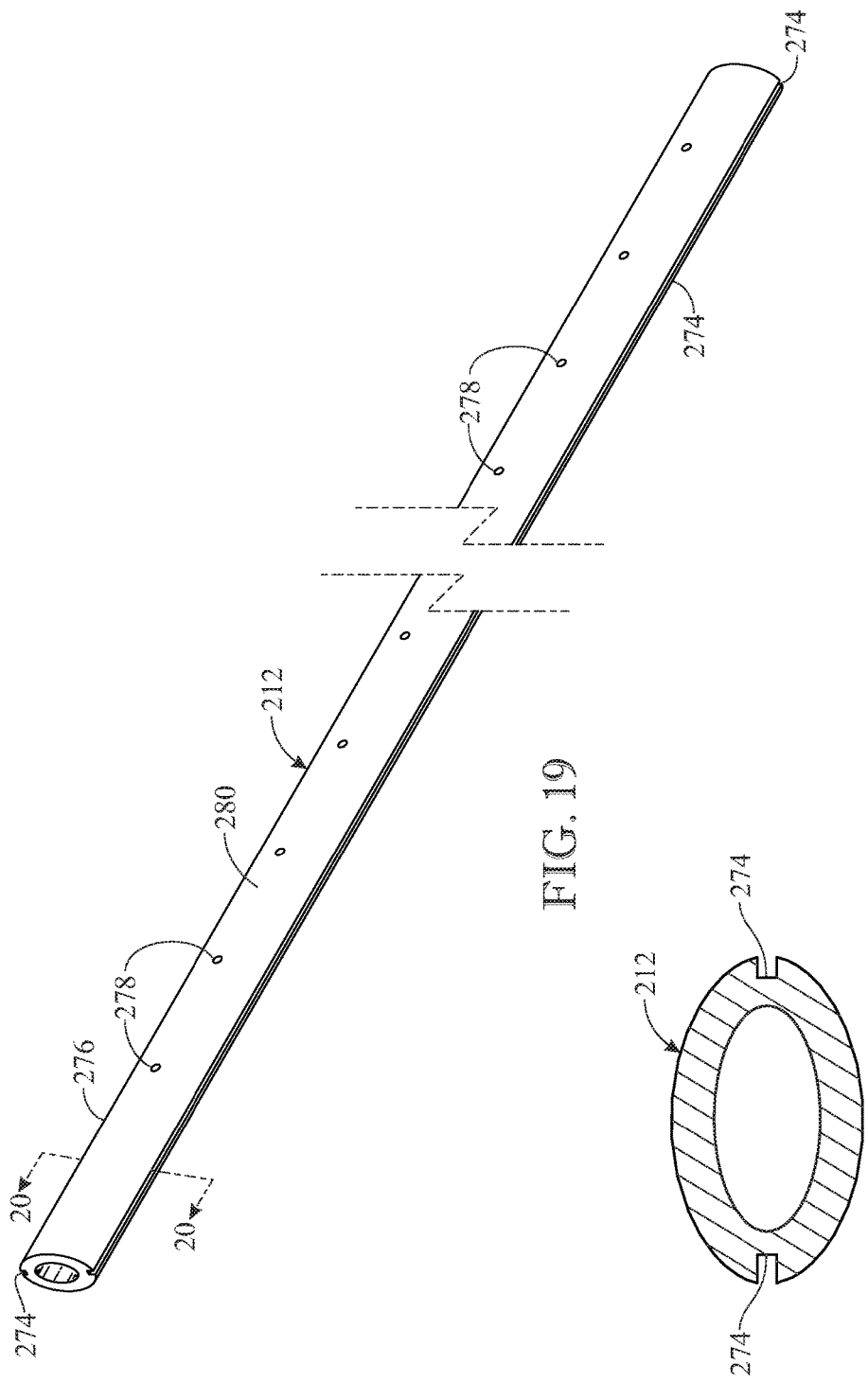

PLANT GROWING HEAVY WEIGHT BEARING SUPPORT ASSEMBLY AND APPARATUS

CROSS REFERENCE TO RELATED APPLICATION

This U.S. non-provisional patent application is a Continuation-In-Part of co-pending U.S. Non-provisional patent application Ser. No. 15/218,659, filed on Jul. 25, 2016, which, in-turn, is a Continuation of U.S. Non-provisional patent application Ser. No. 14/814,788, filed on Jul. 31, 2015, and issued as U.S. Pat. No. 9,456,689, on Oct. 4, 2016, which, in-turn, claims the benefit of U.S. Provisional patent application No. 62/193,767, filed on Jul. 17, 2015. Each application identified above is hereby incorporated-by-reference in their entirety.

FIELD OF THE INVENTION

The present invention relates generally to indoor farming, and more particularly, is concerned with a high load-bearing modular support assembly and apparatus for enabling and facilitating flexible, scalable and dynamic, hydroponic and/or aeroponic indoor vertical farming.

BACKGROUND OF THE INVENTION

There is an increasingly popular view that the Earth's population growth will outstrip resources essential to food production within the next 30 years and, furthermore, that upwards of 80 percent of this additional population will primarily reside within urban centers. Usable farmland and fresh water supplies are being depleted at an ever-increasing pace. Presently, the United States is the largest producer of food crops in the world. The United States' agricultural industry has created most of the innovations responsible for today's modern farming practices. But, this has come at a cost, with innovation-driven farm practices responsible for many of the most pressing issues surrounding food safety and production sustainability. Today, a vast majority of foods are produced that are over-processed, loaded with harmful chemicals, and virtually devoid of nutritional value and taste. Therefore, it comes as no surprise that efforts are now heavily redirected away from the present deleterious farming practices which predominantly take place outdoors away from our cities.

Indoor farming within city boundaries—and, more particularly, indoor vertical farming—is not new. However, its growth has been stymied and it has failed to gain the traction necessary for mainstream appeal and acceptance. Despite the growing desire for organic foods and the popularity of hydroponic growth of food plants, most manifestations of indoor vertical farming have been relatively small, spotty individual efforts, such as, for example, greenhouses on rooftops or perhaps spread across a few acres of ground, or crude setups in relatively small warehouses. These limited efforts are at least partly due to underdeveloped strategies resulting from narrowly-focused thinking.

At the same time, it is well known that many cities have excessive inventories of inactive commercial and residential buildings (e.g. office buildings, warehouse complexes, apartment complexes, strip malls, old hotels and the like) and it would be highly desirable to see them revitalized into useful establishments. It would seem that the development of technologies that would enable these buildings to support growth of a wide variety of farm produce would provide substantial economic benefits in the form of jobs that cannot be exported or outsourced, and sustainability benefits in terms of enhanced food security and safety.

Many hydroponic growing systems have been developed outdoors within greenhouses or similar structures. In fact, it is likely that at least some individuals have successfully attempted to create indoor plant growth systems that function indoors where they are not vulnerable to insects and vermin, adverse weather conditions, and utilize artificial lighting so that they are not reliant on natural lighting from Mother Nature. However, a major obstacle remains when it comes to the challenge of economically beneficial conversion of such excessive indoor spaces for creating indoor vertical farming. That is, until now, there has been a lack of adequate equipment having the necessary characteristics, such as high load-bearing capability (enabling growth of heavier vegetables, potatoes, etc.), highly-efficient use of space, and a flexible design lending itself to scalability, which would greatly facilitate implementation of plant growing modules that could be easily transported from location to location along a support surface (e.g. an underlying floor), combinable to form optimized plant growing systems, and easily disassembled and reconfigured, or transformed, for maximizing efficient implementation across myriad varying application-specific pre-existing indoor space configurations.

Accordingly, there remains a need in the farming science and industry arts for an innovation that would overcome the aforementioned deficiencies and problems that remain unsolved—and thereby retard the implementation of indoor vertical farming—while also serving to revitalize abandoned and/or inactive commercial and residential buildings, and simultaneously creating jobs.

SUMMARY OF THE INVENTION

The present invention is directed to an innovation that overcomes the aforementioned, as-of-yet unsolved, deficiencies and problems, via the provision of a high weight-bearing plant growing support assembly and apparatus enabling and facilitating a flexible and scalable dynamic indoor vertical farming system, which will foster revitalization of abandoned and/or inactive commercial and residential buildings.

In one aspect of the present invention, a plant growing support assembly includes:
  a plurality of platforms, each of the platforms including
    a main platform portion formed by a plurality of platform sections,
    a plurality of pairs of matching threaded elements fastened together so as to affix two sides of each of said platform sections to adjacent sides of two adjacent platform sections and dispose an inner segment of each platform section adjacent to inner segments of the other platform sections to define a central opening in the main platform portion and dispose an outer segment of each platform section diagonally across each platform section from, outwardly and remote of, and extending parallel to, the inner segment of the platform section,
    a plurality of extension portions each affixed to and protruding outwardly from the outer segment of one of the platform sections of the main platform portion, and
    a plurality of annular guides each affixed to one of the extension portions and spaced outwardly from the outer segment of the each platform section, each annular guide defining a passage therethrough;

a plurality of elongated posts spaced apart from one another about the plurality of platforms, the elongated posts disposed parallel to one another and extending vertically upright through the passages of the annular guides affixed to the extension portions of each platform so as to vertically displace and align the platforms relative to one another along the elongated posts and thereby the plurality of platforms defining a bottom platform supporting lower ends of the elongated posts, an upper platform movable relative to the elongated posts toward and away from upper ends of the elongated posts, and a lower platform spaced above the bottom platform and below the upper platform, the upper and lower platforms being movable along the elongated posts toward and away from each other and the bottom platform; and a plurality of support clips selectively attachable to the elongated posts so as to support the upper and lower platforms at different heights along the elongated posts above and relative to the bottom platform.

In another aspect of the present invention, the plant growing support assembly also includes a plurality of caster wheel devices being spaced apart from one another and mounted to respective ones of the extension portions of the bottom platform and below the extension portions and the annular guides affixed thereto spaced outwardly from the outer segment of each platform so as to mobilize the support assembly.

In another aspect of the present invention, each of the elongated posts is of a solid construction and has a pair of grooves extending along each of the elongated posts between upper and lower ends thereof, each groove being formed into one of a pair of opposite arcuate edges of each elongated post. Each of the elongated posts also has a plurality of apertures formed therein at equal vertical spacing from one another along an outer side of each elongated posts and being spaced from the grooves at the opposite arcuate edges of each elongated post such that different sets of the apertures in the elongated posts, being aligned with one another, are defined at different heights along the elongated posts.

In another aspect of the present invention, each of the support clips includes:
 a band having a resiliently yieldable construction and a configuration matching the outer side of a respective one of the elongated posts;
 a hole defined through the band and alignable with a selected one of the apertures in the outer side of the one elongated post;
 a pin insertable through the hole of the band and into one of the apertures in the outer side of the one elongated post; and
 a pair of tabs affixed on opposite ends of the band and projecting toward one another so as to fit into the pair of grooves of the one elongated posts such that the band of each support clip is movable along the outer side of the one elongated post to align the hole of the band with a selected one of the apertures so that with the pin inserted through the hole of the band and into the selected one aperture the support clip supports a respective one of the upper and lower platforms at a selected height along the elongated posts above and relative to the bottom platform.

In another aspect of the present invention, the plant growing apparatus includes:
 a plant growing support assembly including
  a plurality of platforms, each of the platforms including
   a main platform portion having a plurality of corners peripherally spaced apart from one another,
   a plurality of extension portions each affixed to and protruding outwardly from one of the corners of the main platform portion, and a plurality of annular guides each affixed to one of the extension portions and spaced outwardly from one of the corners of the main platform portion, each annular guide defining a passage therethrough;
  a plurality of elongated posts spaced apart from one another about the plurality of platforms, the elongated posts disposed parallel to one another and extending vertically upright through the passages of the annular guides of the platforms so as to vertically displace and align the platforms relative to one another along the elongated posts and thereby the plurality of platforms defining a bottom platform supporting lower ends of the elongated posts, a top platform disposed on upper ends of the elongated posts, an upper platform spaced below the top platform and a lower platform spaced above the bottom platform and below the upper platform, the upper and lower platforms being movable along the elongated posts toward and away from each other and the top and bottom platforms; and
  a height control mechanism mounted on and extending above the top platform and coupled to the upper platform at respective ones of the extension portions at a diagonally opposite pair of the corners of the upper platform through interaction relative to a diagonally opposite pair of the corners of the top platform aligned above the corners of the upper platform such that operation of the height control mechanism selectively raises or lowers the upper platform along the elongated posts.

In another aspect of the present invention, the height control mechanism includes:
 a rotary power source;
 a support housing centrally mounted on the top platform and containing the rotary power source;
 a plurality of braces extending diagonally between and rigidly interconnecting the support housing and the corners of the top platform; and
 a drive transmission assembly interconnecting the rotary power source with the diagonally opposite pair of corners of the upper platform such that selective operation of the rotary power source correspondingly raises or lowers the upper platform along the elongated posts relative to the stationary top platform.

In another aspect of the present invention, the drive transmission assembly includes:
 a pair of rotary spools mounted above the top platform at a pair of locations in opposite directions from the rotary power source;
 a pair of rotary pulleys mounted above the diagonally opposite pair of corners such that each of the rotary pulleys is aligned with one of the rotary spools;
 a pair of elongated drive shafts coupled to and extending in opposite directions from the rotary power source to respective ones of the rotary spools, and
 a pair of cables each connected at a first end to one of the rotary spools and connected at a second end to one of the diagonally opposite pair of corners of the upper platform such that actuation of the rotary power source to rotate the pair of elongated drive shafts in one or the other of opposite rotary directions cause the pair of cables to extend and retract away from and toward the rotary spools resulting in the upper platform being lowered and raised along the elongated posts relative to the top platform.

In another aspect of the present invention, the plant growing apparatus includes:
- a plant growing support assembly including
  - a plurality of platforms, each of the platforms including
    - a main platform portion formed by a plurality of platform sections,
    - a plurality of pairs of matching threaded elements fastened together so as to affix two sides of each of said platform sections to adjacent sides of two adjacent platform sections and dispose an inner segment of each platform section adjacent to inner segments of the other platform sections to define a central opening in the main platform portion and dispose an outer segment of each platform section diagonally across each platform section from, outwardly and remote of, and extending parallel to, the inner segment of the platform section,
    - a plurality of extension portions each affixed to and protruding outwardly from the outer segment of one of the platform sections of the main platform portion, and
    - a plurality of annular guides each affixed to one of the extension portions and spaced outwardly from the outer segment of one of the platform sections, each annular guide defining a passage therethrough being oval in cross-sectional configuration,
  - a plurality of elongated posts each of solid construction and oval in cross-sectional configuration and spaced apart from one another about the plurality of platforms, the elongated posts disposed parallel to one another and extending vertically upright through the passages, and non-rotatable relative to respective ones, of the annular guides affixed to the extension portions of the platforms so as to vertically displace and align the platforms relative to one another along the elongated posts and thereby the plurality of platforms defining a bottom platform supporting lower ends of the elongated posts, a top platform disposed on upper ends of the elongated posts, an upper platform spaced below the top platform and a lower platform spaced above the bottom platform and below the upper platform, the upper and lower platforms being movable along the elongated posts toward and away from each other and the top and bottom platforms, and
  - a plurality of support clips selectively attachable to the elongated posts so as to support the upper and lower platforms at different heights along the elongated posts above and relative to the bottom platform; and
- a height control mechanism mounted on and extending above the top platform and coupled to the upper platform at respective ones of the extension portions at a diagonally opposite pair of the outer segments of the main platform portion such that operation of the height control mechanism selectively raises or lowers the upper platform along the elongated posts.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 19 presents an enlarged isometric view of one of a plurality of elongated posts of the apparatus originally presented in FIG. 11;

FIG. 20 presents a further enlarged cross-sectional view of the one elongated post of the apparatus as take along section line 20-20 in FIG. 19;

Like reference numerals refer to like parts throughout the several views of the drawings.

DETAILED DESCRIPTION OF REPRESENTATIVE IMPLEMENTATIONS

Figure 1:
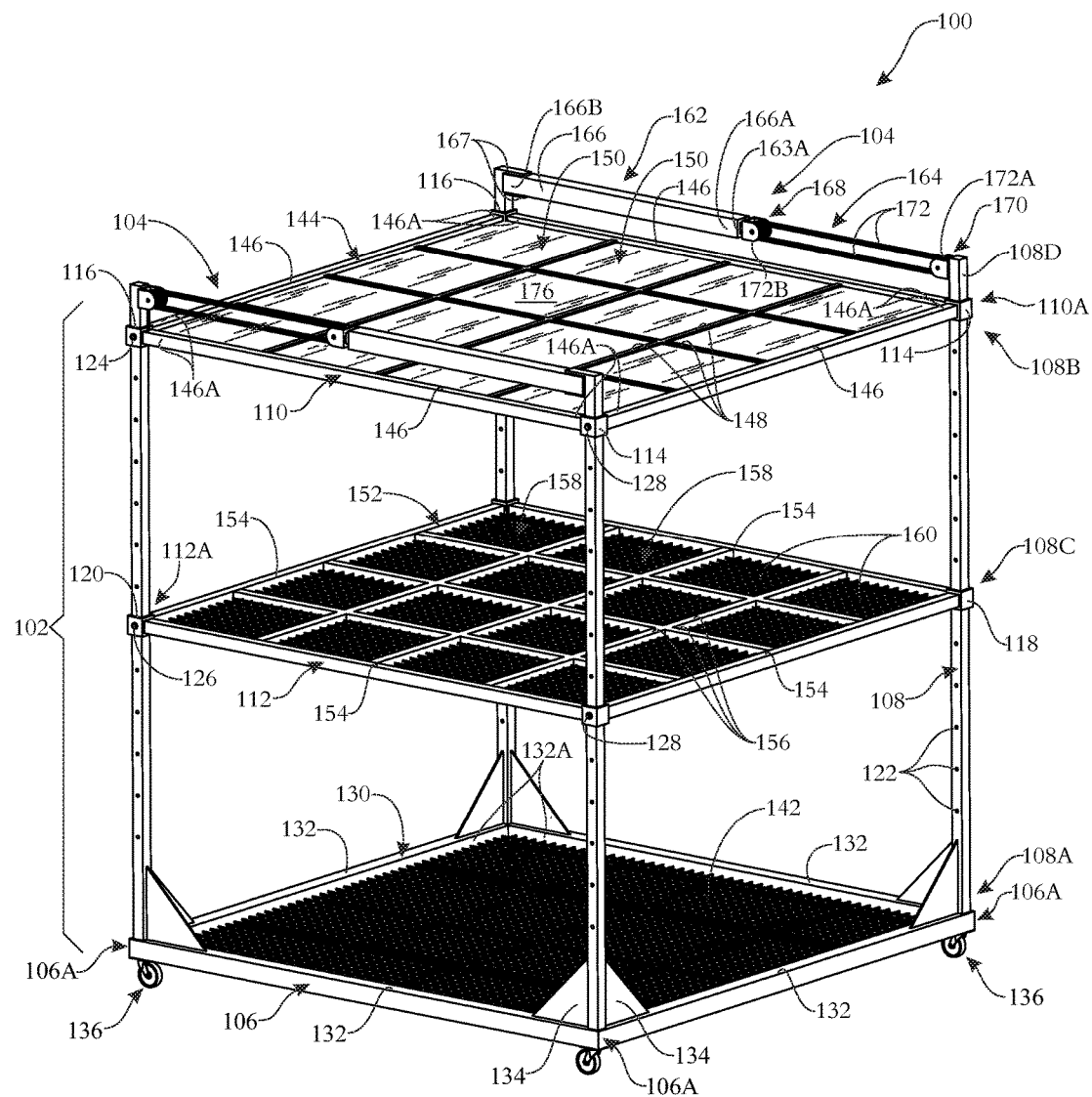
FIG. 1 presents a top isometric view of an exemplary embodiment of a plant growing apparatus in accordance with the above cross-referenced patented invention.
Figure 2:
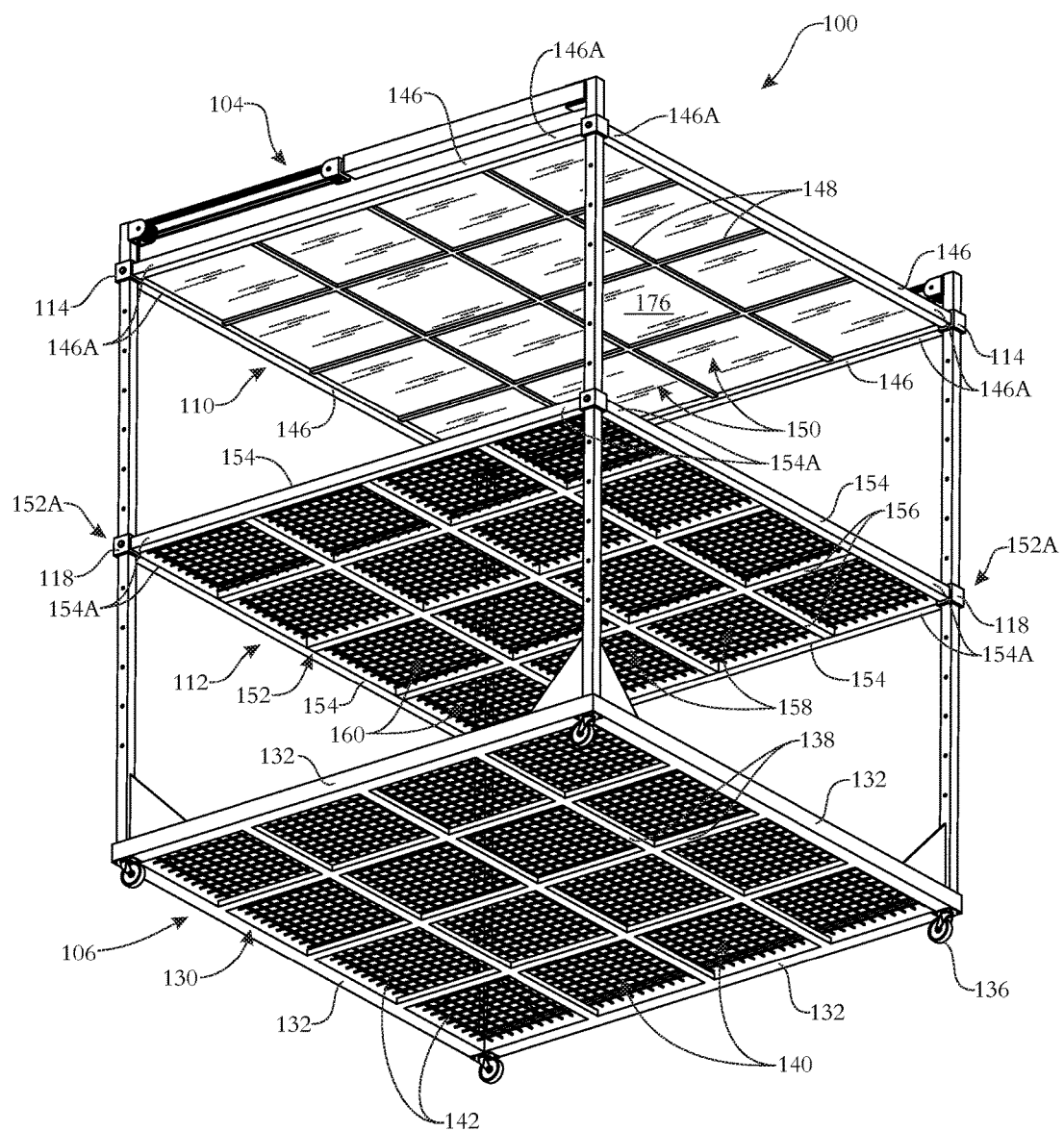
FIG. 2 presents a bottom isometric view of the apparatus originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now particularly to FIGS. 1 through 4, there is illustrated an exemplary implementation of a plant growing apparatus, generally designated 100, according to the above cross-referenced patented invention. The plant growing apparatus 100 includes a plant growing support assembly 102, according to the above cross-referenced patented invention, and a pair of height control mechanisms 104 incorporated with the support assembly 102. The support assembly 102 of the plant growing apparatus 100 includes a bottom platform 106, a plurality of vertically-disposed elongated posts 108, a top platform 110 and an intermediate platform 112 disposed between the upper/top and lower/bottom platforms. A plurality of elongated posts 108, and preferably four posts, are spaced-apart from one another and extend upright and generally parallel to one another. The posts 108 at their lower end portions 108A extend upwards from, and are affixed to, the bottom platform 106, preferably at respective spaced apart corners 106A thereof.

The top platform 110 has a plurality of spaced-apart couplers 114 disposed about elongated posts 108 and affixed at respective corners 110A of the top platform 110, which define passages 116 therethrough that slidably receive an uppermost length 108D of the upright corner posts 108 along corresponding upper portions 108B thereof. Similarly, the intermediate platform 112 has a plurality of spaced-apart couplers 118 disposed about an intermediate length 108C, or portion, of the elongated posts 108 affixed at respective corners 112A of the intermediate platform 112, which define passages 120 therethrough that slidably receive the upright corner posts 108 along corresponding intermediate portions 108C thereof.

Preferably, the upright, or vertically-disposed, corner posts 108 each have a respective series of apertures 122 formed therein at equal vertical spacing from one another along the posts 108, such that different sets of the apertures 122 (in this case sets of four apertures) aligned with one another are defined at varying heights along the posts 108. The couplers 114, 118 of the respective top and intermediate platforms 110, 112 have respective apertures 124, 126 formed therethrough that may be aligned with respective ones of the different sets of the apertures 124 of the upright corner posts 108 by raising and lowering the top and intermediate platforms 110, 112 relative to the posts 108. Also, a plurality of fasteners 128 are provided that fit through selected aligned ones of the different sets of the apertures 122 of the upright corner posts 108 and the apertures 124, 126 of the couplers 114, 118 of the top and intermediate platforms 110, 112 so as to retain the top and intermediate platforms 110, 112 respectively at user-selected elevations along the corresponding upper and intermediate portions 108B, 108C of the posts 108.

More particularly, the bottom platform 106 of the support assembly 102 includes a peripheral frame 130 formed by a plurality of elongated members 132—preferably four members disposed in a rectangular configuration and rigidly affixed to one another at adjacent end portions 132A thereof so as to form the plurality of corners 106A of the bottom platform 106. The support assembly 102 may also have a plurality of braces 134 and a plurality of caster wheel devices 136. Each brace 134, which, by way of example but not limitation, may be a flat triangular shaped metal plate (as shown), is disposed adjacent to one of the corners 106A of the bottom platform 106 and rigidly affixed thereto, and forms right angles between the lower end portion 108A of one of the upright corner posts 108 and a respective end portion 132A of one of the elongated members 132 of the peripheral frame 130 of the bottom platform 106. Each caster wheel device 136 is disposed below and mounted to one of the corners 106A of the bottom platform 106 so as to mobilize the support assembly 102 for movement relative to a support surface (not shown). The bottom platform 106 also has an interior framework 138 spanning between and rigidly affixed to the elongated members 132 of the peripheral frame 130 of the bottom platform 106. The interior framework 138 of the bottom platform 106 may have a lattice structure defining an array of openings 140 through the bottom platform 106 and a mesh 142 affixed to the interior framework 138 and extending across the openings 140.

The top platform 110 of the support assembly 102 includes a peripheral frame 144 formed by a plurality of elongated members 146 (preferably four, as shown), each of the individual members having opposite ends 146A welded, or otherwise fixedly attached, to couplers 114. Preferably, the elongated members 146 are disposed in a rectangular configuration (as shown) and together with the couplers 114 rigidly affixed to respective end portions 146A of adjacent pairs of the elongated members 146, form the plurality of corners 110A of the top platform 110. As will be apparent to those skilled in the art, variations of the rectangular geometry shown in the Figures are contemplated. Accordingly, although it is preferable to incorporate four peripheral members to form a rectangular periphery, variations on the quantity of peripheral members 132, 146, 154 defining the corresponding geometry of the respective peripheral frameworks 130, 144, 152 may be used to construct the respective lower/bottom platform 106, upper/top platform 110 and intermediate platform 112. The top platform 110 also has an interior framework 148 spanning between and rigidly affixed to the elongated members 146 of the peripheral frame 144. The interior framework 148 of the top platform 110 has a lattice structure defining an array of openings 150 through the top platform 110.

The intermediate platform 112 of the support assembly 102 includes a peripheral frame 152 formed by a plurality of elongated members 154 (e.g., preferably four members, as depicted in the accompanying Figures). The elongated members 154 are disposed in a rectangular configuration and, together with the couplers 118, are rigidly affixed to respective end portions 154A of adjacent pairs of the elongated members 154, to form the plurality of corners 112A of the intermediate platform 112. The intermediate platform 112 also has an interior framework 156 spanning between and rigidly affixed to the elongated members 154 of the peripheral frame 154. The interior framework 156 of the intermediate platform 112 has a lattice structure defining an array of openings 158 through the intermediate platform 112 and a mesh 160 affixed to the interior framework 156 and extending across, or spanning, the openings 158.

By way of example, but not limitation, the bottom platform 106 may be disposed spaced above the support surface (not shown), and in a horizontal plane, by the plurality of caster wheel devices 136. Also, by way of example but not limitation, the respective top and intermediate platforms 110, 112 are supported at different elevations above the bottom platform 106, and thus the support surface, and along and in substantially parallel horizontal planes by the upright corner posts 108. The elongated members 132, 146 and 154 of the respective bottom, top and intermediate platforms 106, 110 and 112, and the corresponding interior frameworks 138, 148 and 156 thereof, may, by way of example but not limitation, be in the form of elongated hollow bars or rods of rectangular cross-section constructed of steel or a similar rigid material, such as one-by-one inch square bars. The mesh 142, 160 of the respective bottom and intermediate platforms 106, 112 may, by way of example but not limitation, be in the form of squares of one-half inch (½") stainless steel material or the like. By of example but not limitation, the upright corner posts 108 may be in the form of elongated hollow bars or rods of rectangular cross-section made of steel or the like, such as one-by-one inch, two-by-two inch or three-by-three inch square bars. The lattice structure of the interior frameworks 138, 148 and 156 may by way of example but not limitation be four-by-four interior square frames. The couplers 114, 118 may by way of example but not limitation be comprised of hollow annular collars constructed from steel or the like, of such size to accommodate the bars or rods forming the posts 108.

Each of the pair of height control mechanisms 104 of the plant growing apparatus 100 extends between and is mounted to upper end portions 108D of a selected adjacent pair of the plurality of upright corner posts 108 extending beyond a corresponding pair of the couplers 114 of the top platform 110. Also, each of the height control mechanisms 104 is coupled to the top platform 110 at a respective one of the couplers 114 disposed at one of a diagonally opposite pair of the corners 110A of the top platform 110. Thus, the height control mechanisms 104, being concurrently operable to selectively raise or lower the top platform 110 along the upright corner posts 108, apply respective lifting forces at one of the diagonally opposite pairs of corners 110A of the top platform 110, so as to minimize possible binding of the top platform 110 relative to the upright corner posts 108 during lowering or raising of the top platform 110 along the length of the posts 108.

More particularly, each of the height control mechanisms 104 of the plant growing apparatus 100 includes an actuator 162 and a pulley-and-cable arrangement 164. Each actuator 162 has a main body 166 received between and fixedly coupled to a pair of cantilevered flanges 167 extending inwardly from the uppermost length/end 108D of the upright corner posts 108 extending above one of the diagonally-opposite one pair of the corners 110A of the top platform 110. Likewise, each height control mechanism 104 is fixedly coupled (at second pulley 170) to an opposing pair of cantilevered flanges 171 extending inwardly from the uppermost length/end 108D of an adjacent uppermost length/end 108D of an adjacent post 108. Each pulley-and-cable arrangement 164 includes a first pulley 168, a second pulley 170 and a length of cable 172. The first pulley 168 is coupled to the one end 162A of the actuator 162 and is extendable from and retractable towards the main body 166 of the actuator 162. The second pulley 170 is coupled to the upper end 108D of one of the upright corner posts 108 extending through one of the diagonally opposite one pair of the corners 110A of the top platform 110. The cable 172 is connected at a first end 172A to the one of the diagonally opposite one pair of the corners 110A of the top platform 110, extends therefrom about and between the first and second pulleys 168, 170 and is connected at a second end 172B, being opposite to the first end 172A, to the one end 162A of the actuator 162 such that the concurrent operation of the actuators 162 to extend and retract the one end 162A of each actuator 162 and the first pulley 168 therewith, away from and toward the main body 166 of the actuator 162, results in the top platform 110 being either lowered or raised along the length of the posts 108. The actuators 162 may be operated, by way of example but not limitation, using either hydraulic or pneumatic pressure.

The operation and function of motor driven linear actuator or pulleys rotated by drive cords or belts is well known. For example, descriptions of various conventional means for employing such arrangements using a power unit to extend and retract a cord to move an attached assembly is clearly described and shown in U.S. Pat. No. 4,915,461 to Kingsborough, U.S. Pat. No. 6,367,898 to Jobe, and U.S. Patent Application Publication No. 20130241384, which are all incorporated by reference herein in their entireties. Furthermore, various mechanisms are commercially available for producing controlled movement of a mechanical element or a connecting point thereof. For example, hydraulic and pneumatic cylinders are commonly used to produce forceful movement of arms and other mechanical elements of numerous mechanical, prosthetic, and or robotic devices. By way of example, commercially-available pneumatic and hydraulic linear actuators can be found on the following Internet websites: www.robotshop.com; www.greencocylinders.com; www.directindustry.com; and www.thomsonlinear.com.

Figure 3:
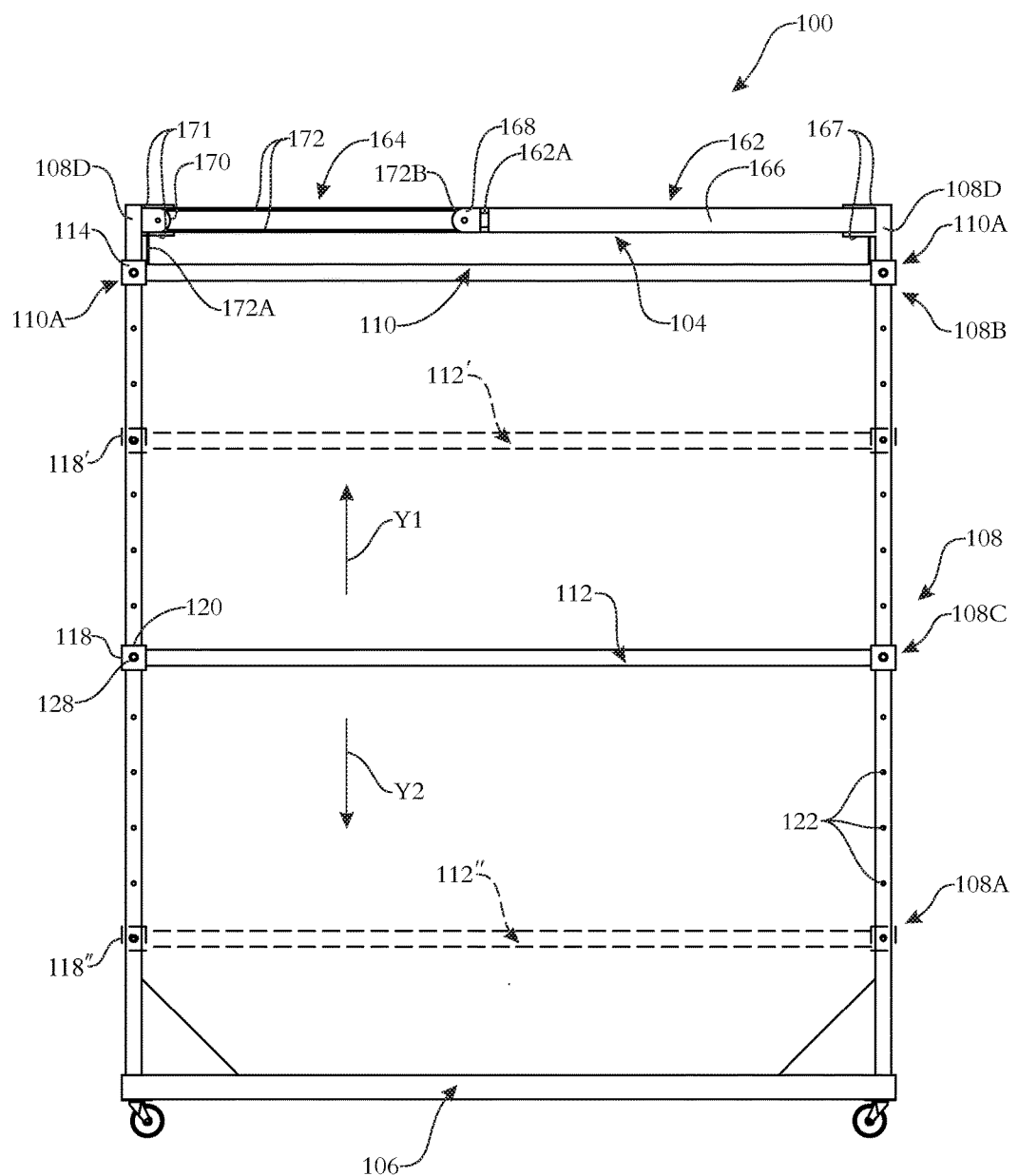
FIG. 3 presents a side elevation view of the apparatus originally introduced in FIG. 1, illustrating examples of positions to which a load-bearing intermediate platform of the apparatus can be manually raised or lowered.
Figure 4:
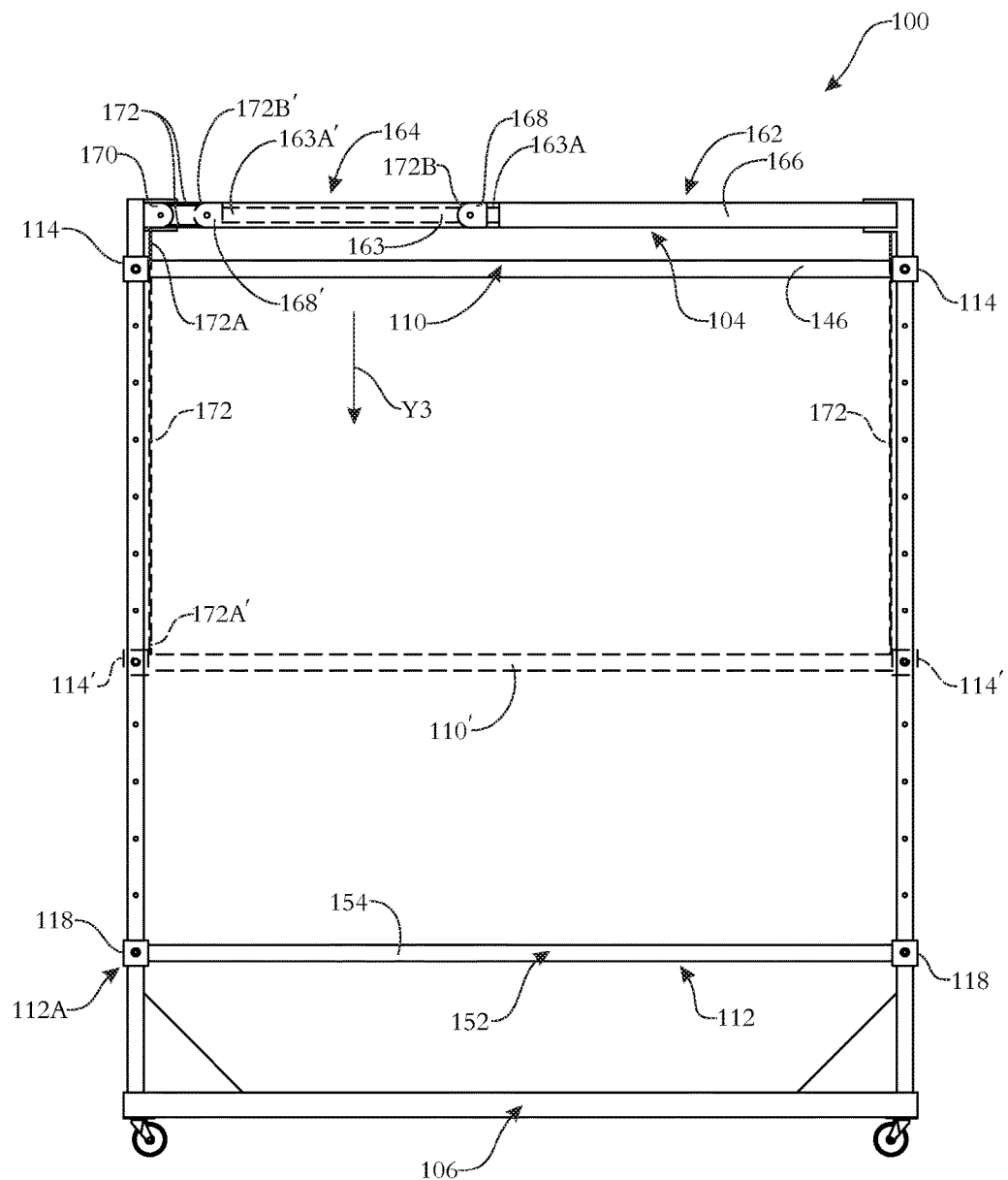
FIG. 4 presents a side elevation view of the apparatus originally introduced in FIG. 1, illustrating an example of a position to which a light-bearing top platform of the apparatus can be lowered by concurrent operation of a pair of height control mechanisms.

As best shown in FIG. 3, by action of the actuators 162 intermediate platform 112, along with corresponding couplers 118, can be vertically translated (as shown by directional arrow Y1) upward to a raised position identified by intermediate platform 112' and couplers 118', through extension of cable length 172. Likewise, in similar fashion, intermediate platform 112, along with corresponding couplers 118, can be translated downward (as shown by directional arrow Y2) to a lowered position identified by intermediate platform 112" and couplers 118", through retraction of cable length 172. In similar fashion, as best depicted by FIG. 4, upper platform 110 can be vertically translated (as shown by directional arrow Y3) along with corresponding couplers 114, for example to a lowered position as indicated by upper platform 110' and couplers 114'.

Referring now primarily to FIGS. 5-9, there is illustrated a plant growing system, generally designated 174, in accordance with the above cross-referenced patented invention. The plant growing system 174 basically includes the support assembly 102 and the pair of height control mechanisms 104 of the plant growing apparatus 100, as described in detail previously above. To summarize, the support assembly 102 includes the bottom platform 106, supported and mobilized by the corner caster wheel devices 136, and the top and intermediate platforms 110, 112, vertically spaced apart from one another and the bottom platform 106 by the upright corner posts 108, being rigidly affixed at the corners 106A of the bottom platform 106. The intermediate platform 112 and the posts 108 are connectable to one another so as to retain the intermediate platform 112 at a selected elevation above the bottom platform 106 and along the intermediate portion 108C of the posts 108. Also, the intermediate platform 112 may be disconnected from the posts 108 to manually raise or lower the intermediate platform 112 relative to the posts 108. The pair of height control mechanisms 104 are concurrently operable to raise or lower the top platform 110 relative to the posts 108 to a selected elevation at which the top platform 110 is then connectable to the posts 108 to retain the top platform 110 at the selected elevation above the bottom platform 106 and along the upper portions 108B of the posts 108.

Figure 5:
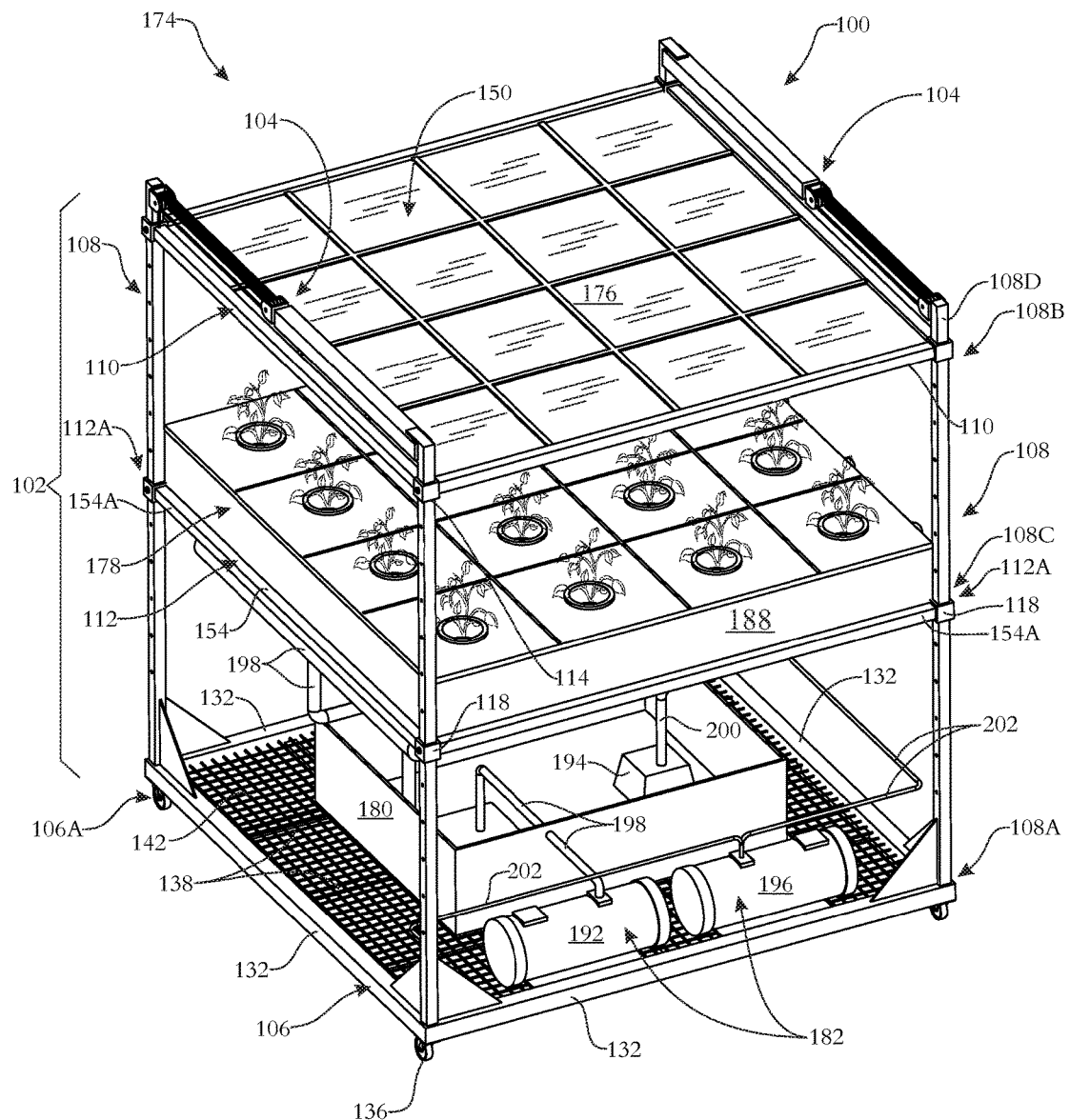
FIG. 5 presents a top isometric view of an exemplary embodiment of a plant growing system in accordance with the above cross-referenced patented invention.
Figure 6:
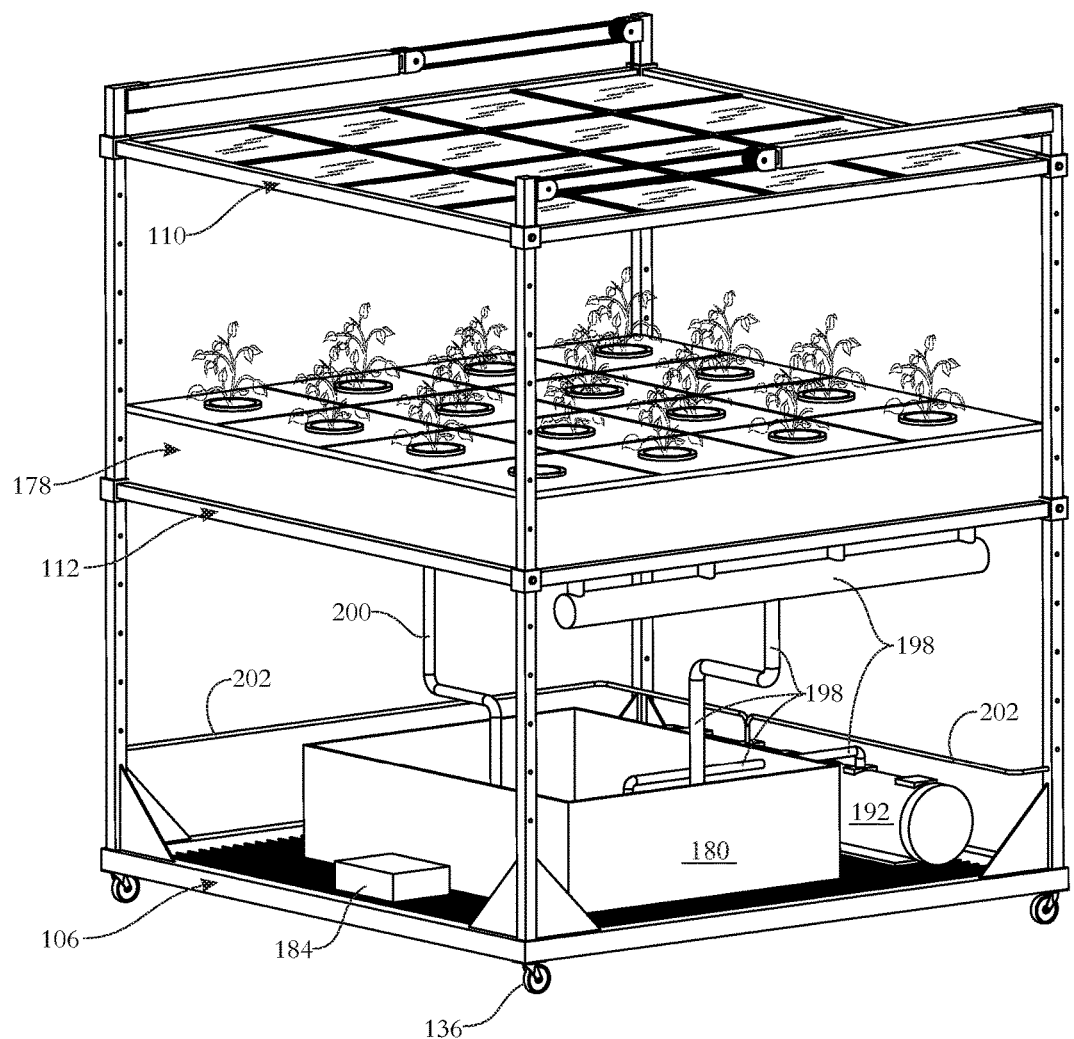
FIG. 6 presents another top isometric view of the system originally introduced in FIG. 5, the system being illustrated at an orientation rotated ninety degrees from that in FIG. 5.
Figure 7:
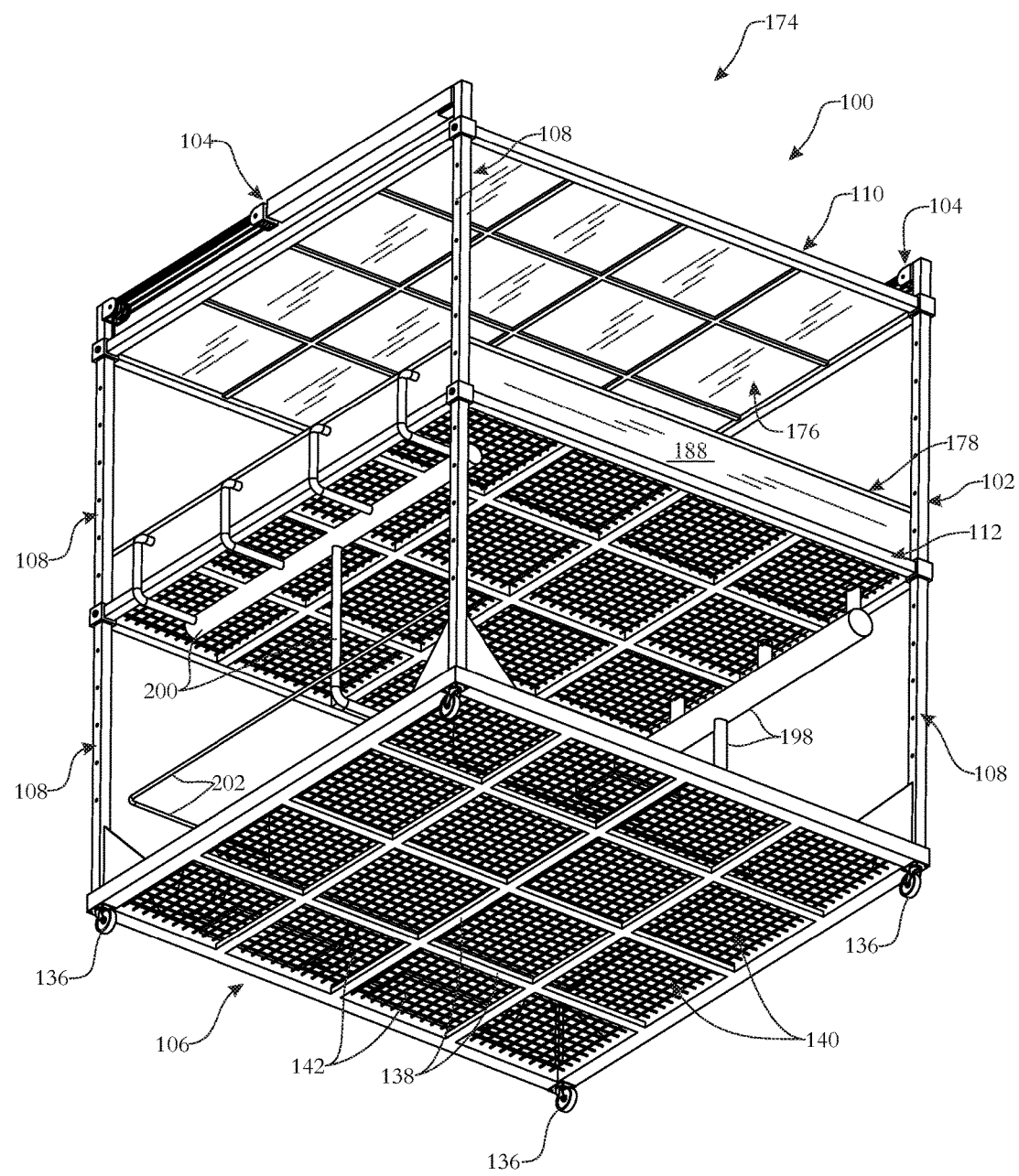
FIG. 7 presents a bottom isometric view of the system as originally introduced in FIG. 5.
Figure 8:
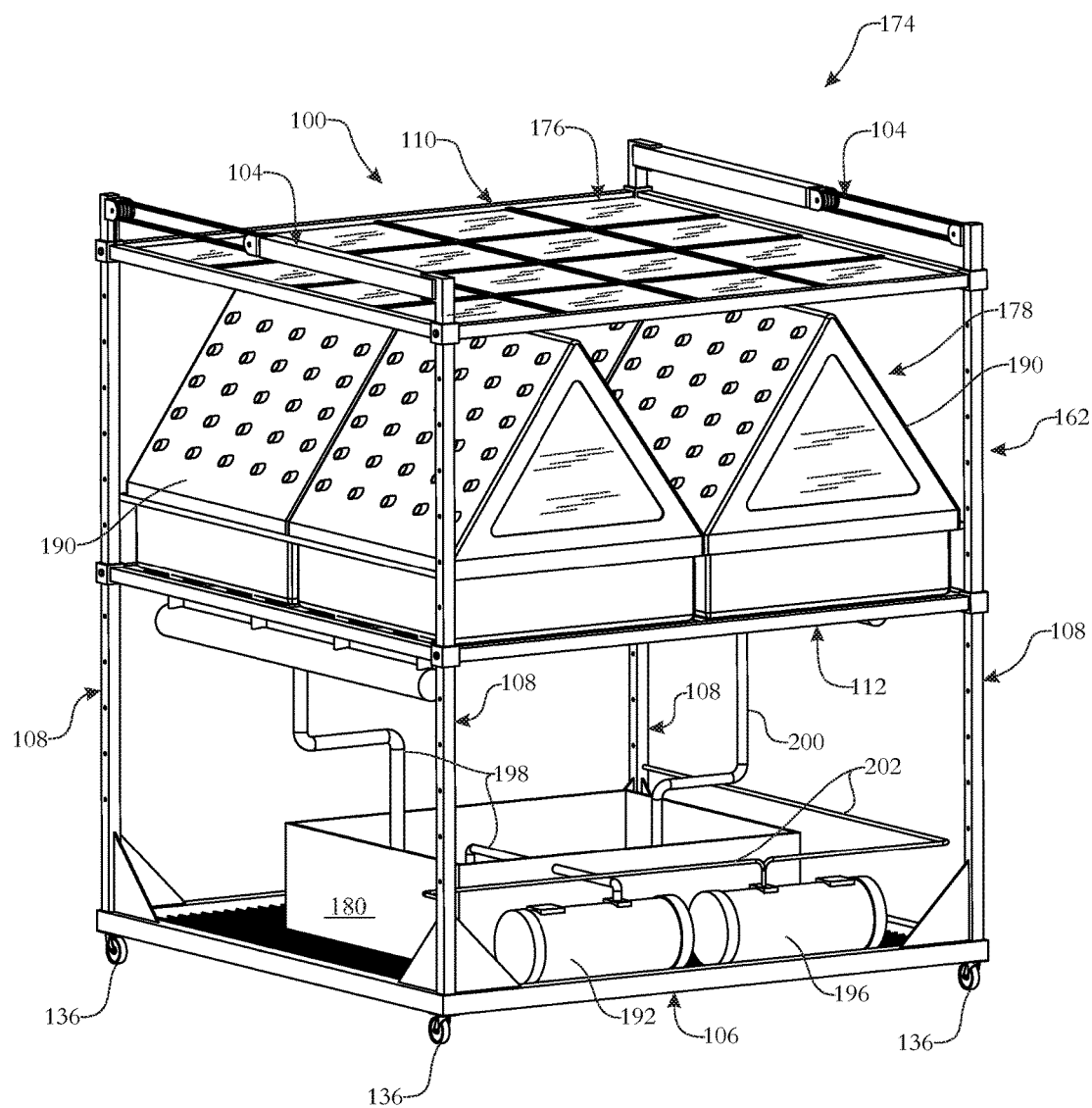
FIG. 8 presents an top isometric view of an alternate embodiment of plant grow cells of the plant growing system.
Figure 9:
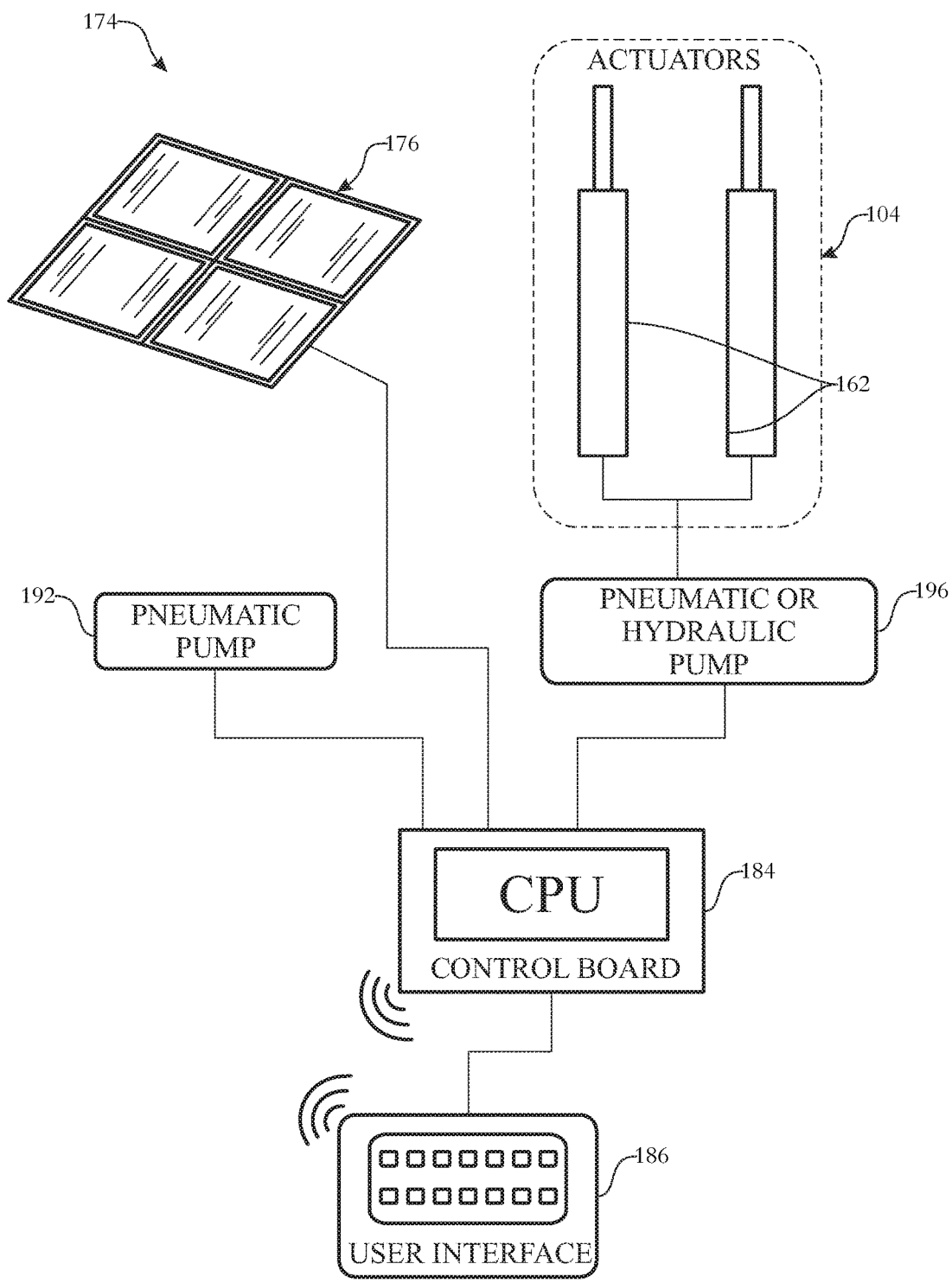
FIG. 9 presents a diagram of the cooperative relationship between the operational components of the systems of FIGS. 5 and 8.
Figure 10:
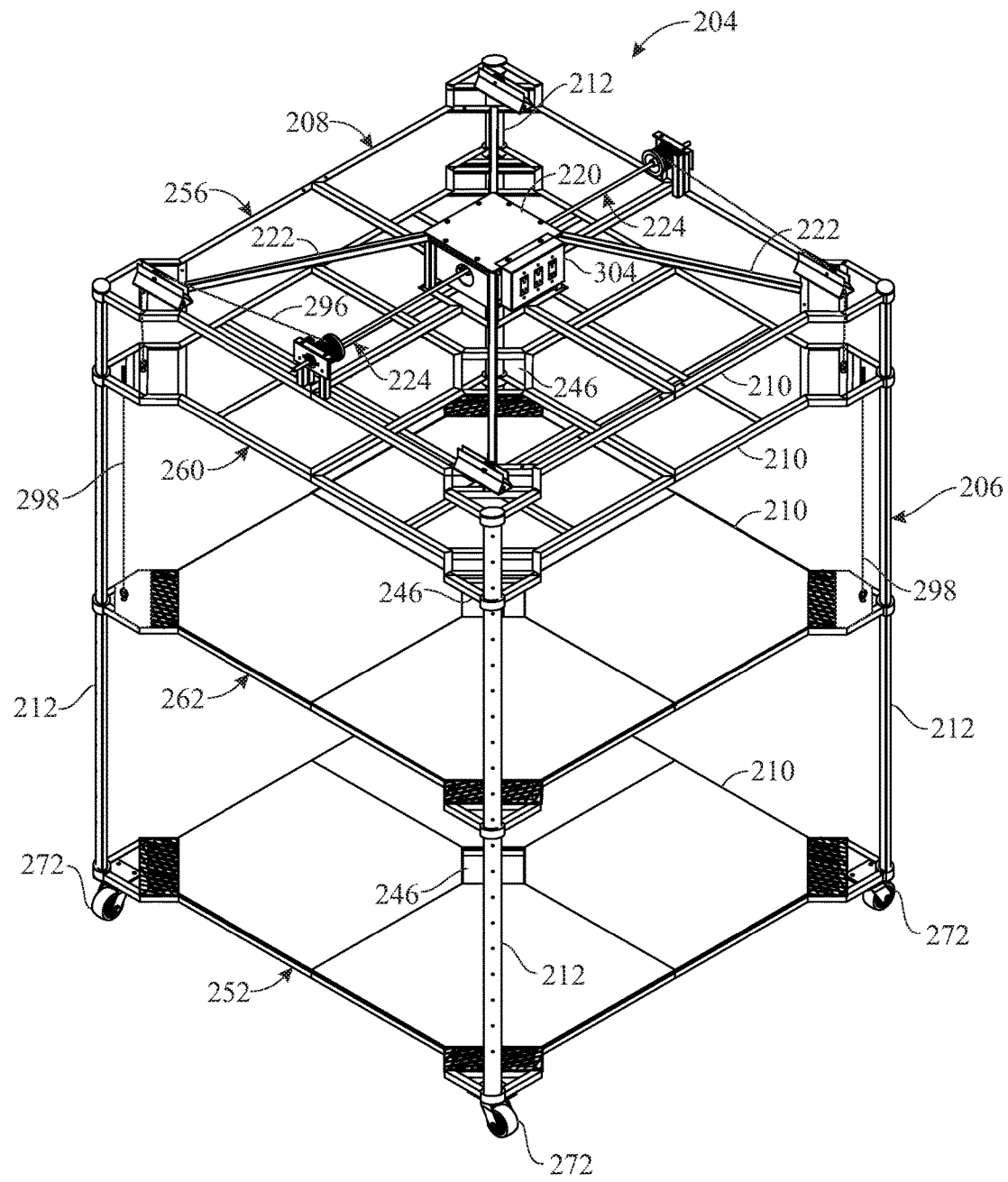
FIG. 10 presents a top isometric assembled view of an alternate exemplary embodiment of a plant growing apparatus in accordance with the present invention.
Figure 11:
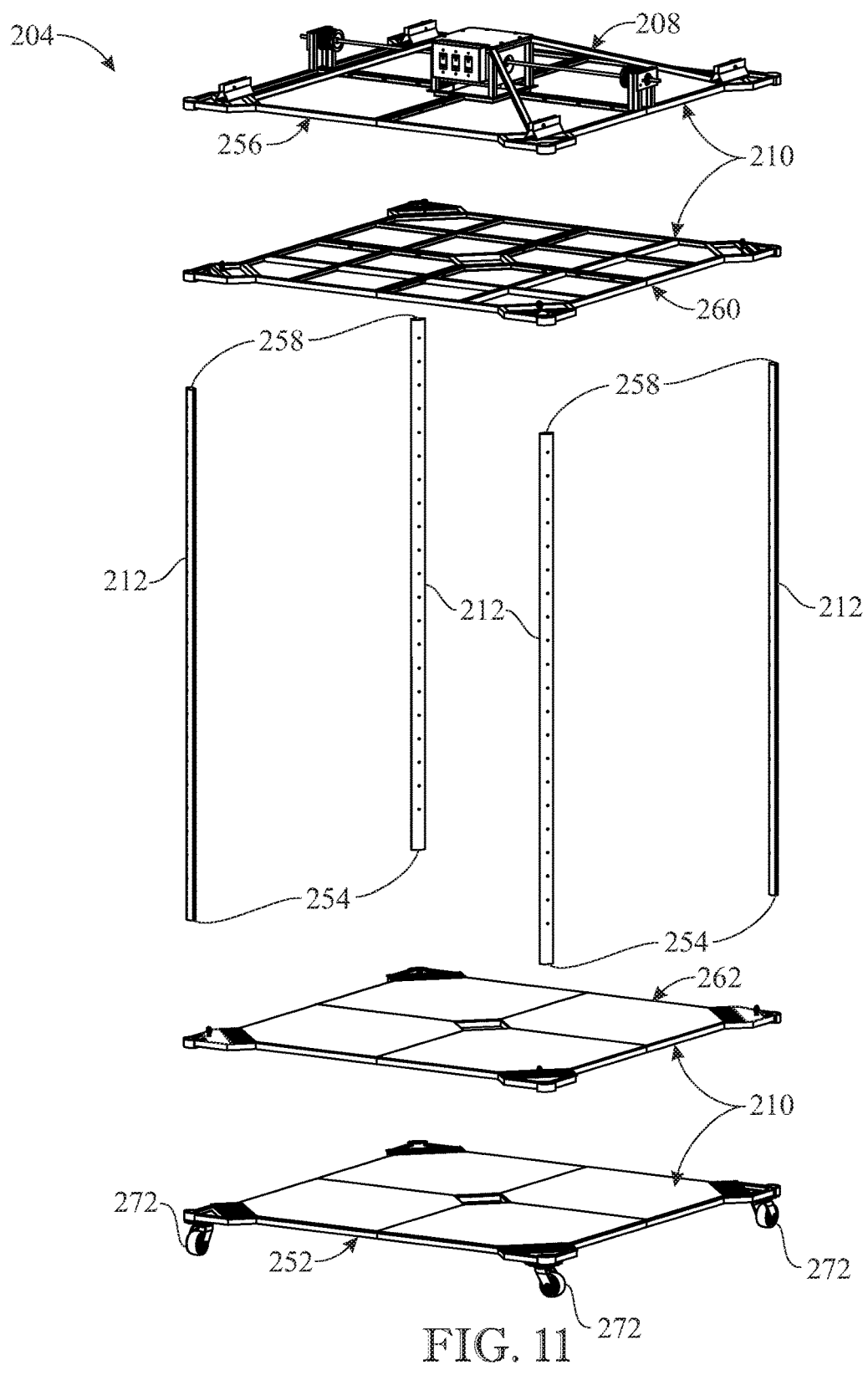
FIG. 11 presents a top isometric exploded view of the apparatus originally presented in FIG. 10.
Figure 12:
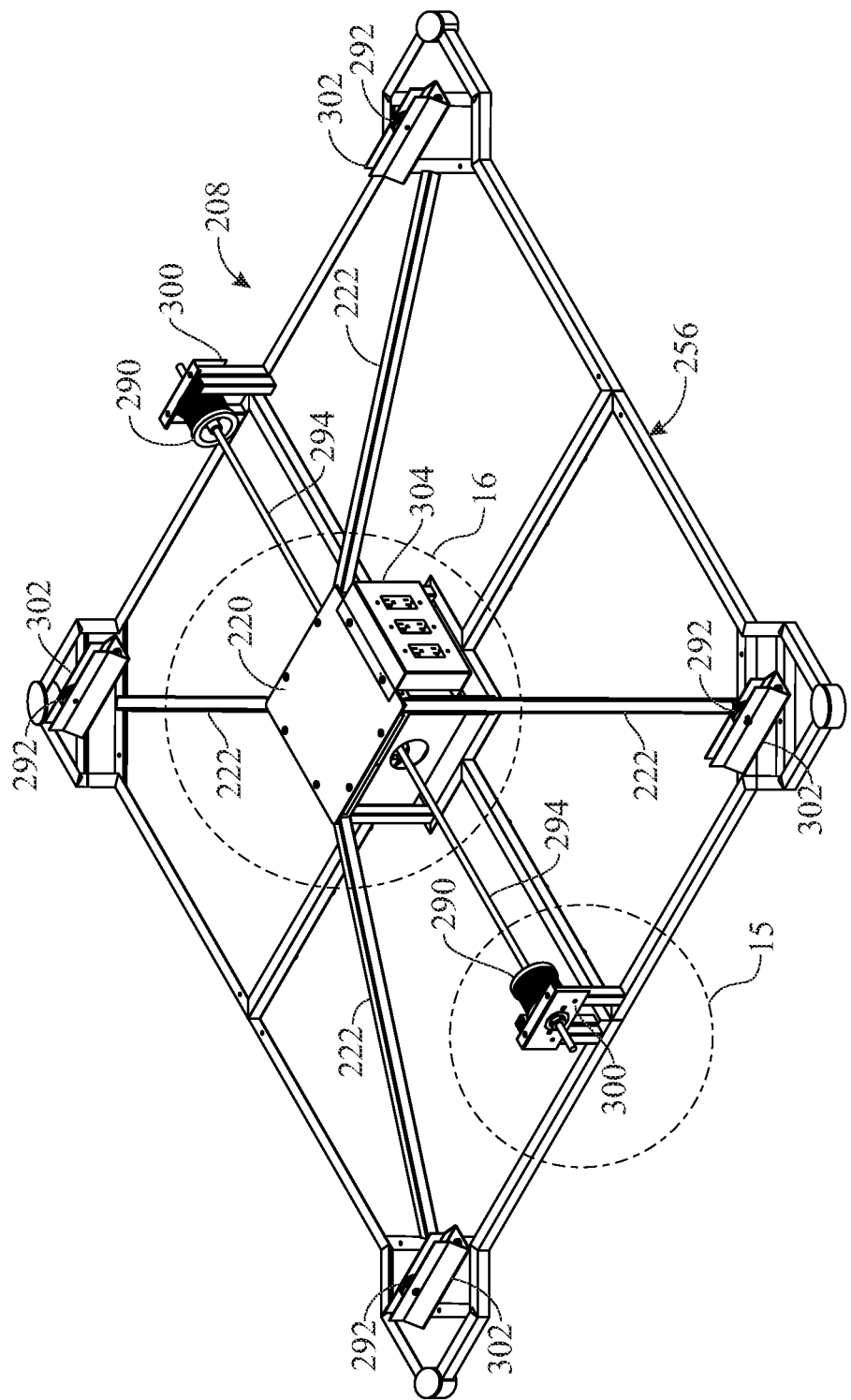
FIG. 12 presents a top isometric assembled view of a top platform and a height control mechanism of the apparatus originally presented in FIGS. 10 and 11.
Figure 13:
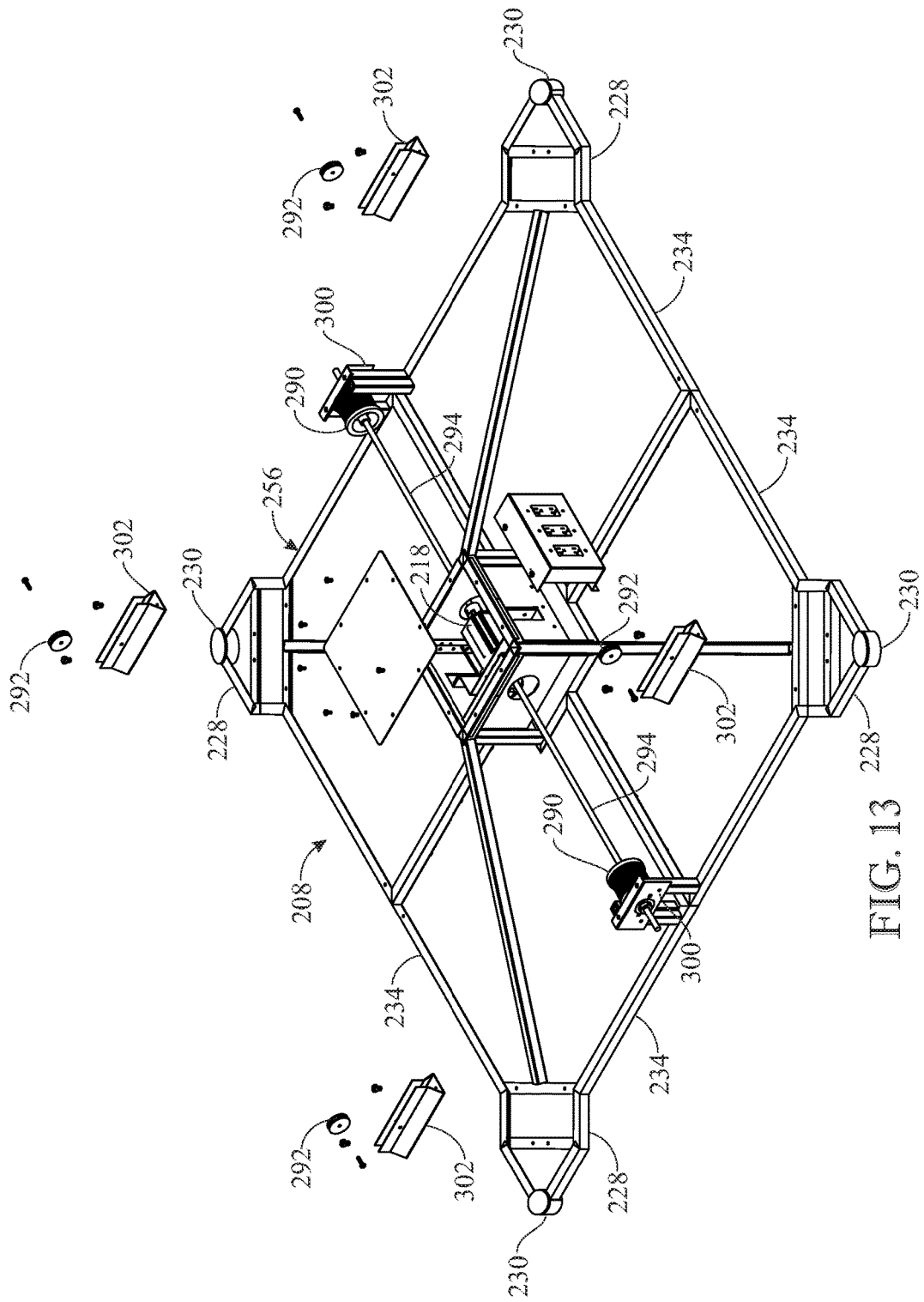
FIG. 13 presents a top isometric exploded view of the top platform and the height control mechanism of the apparatus originally presented in FIG. 12.
Figure 14:
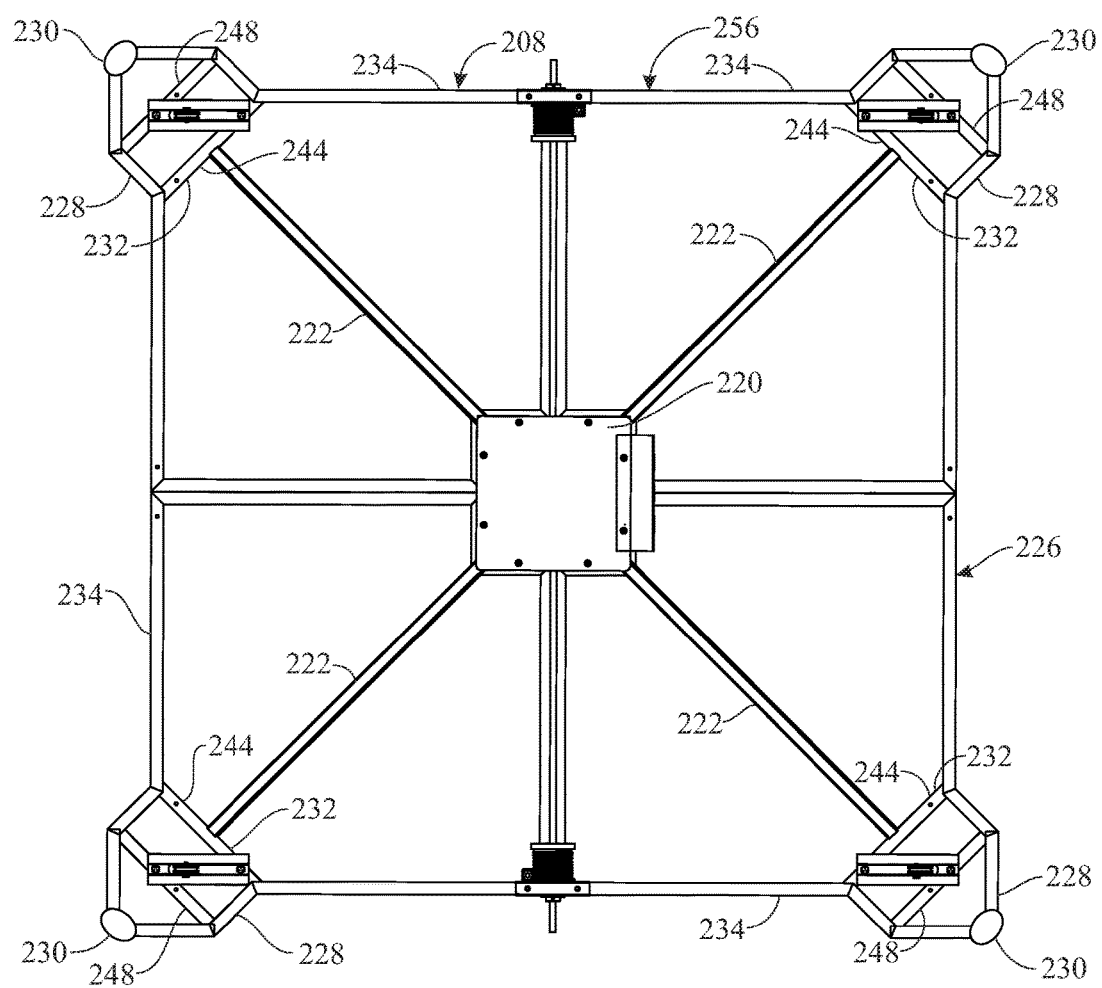
FIG. 14 presents a top plan view of the top platform and the height control mechanism of the apparatus originally presented in FIG. 12.
Figure 15:
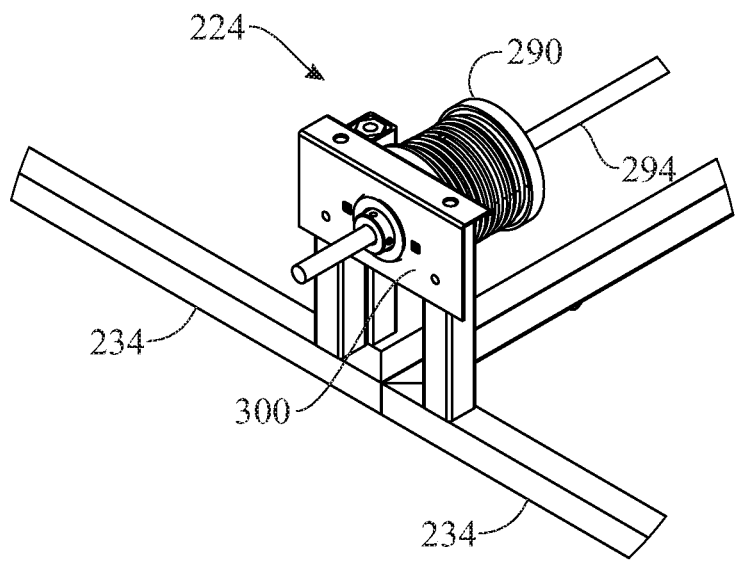
FIG. 15 presents an enlarged top isometric view of one of a pair rotary spools of the height control mechanism of the apparatus encompassed by the dashed circle shown in FIG. 12.
Figure 16:
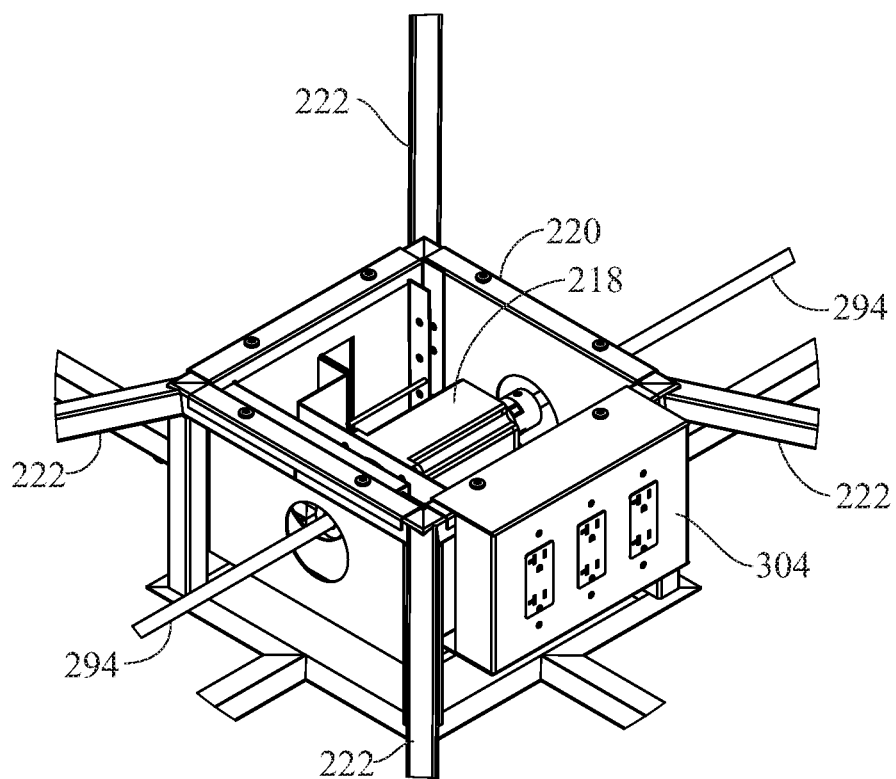
FIG. 16 presents an enlarged top isometric view of a support housing and rotary power source of the height control mechanism of the apparatus encompassed by the dashed circle shown in FIG. 12.
Figure 17:
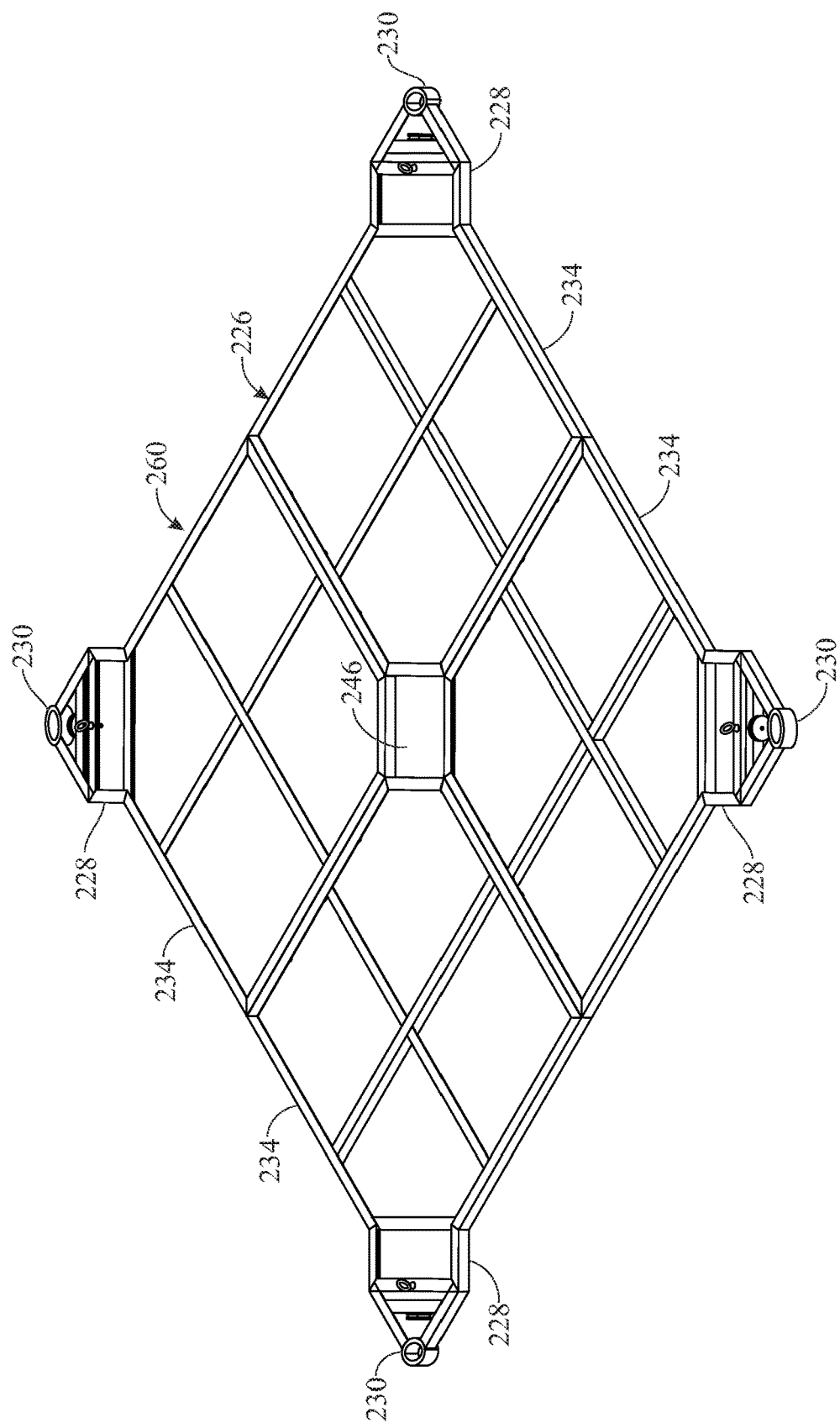
FIG. 17 presents an enlarged top isometric assembled view of an upper platform of the apparatus originally presented in FIG. 11.
Figure 18:
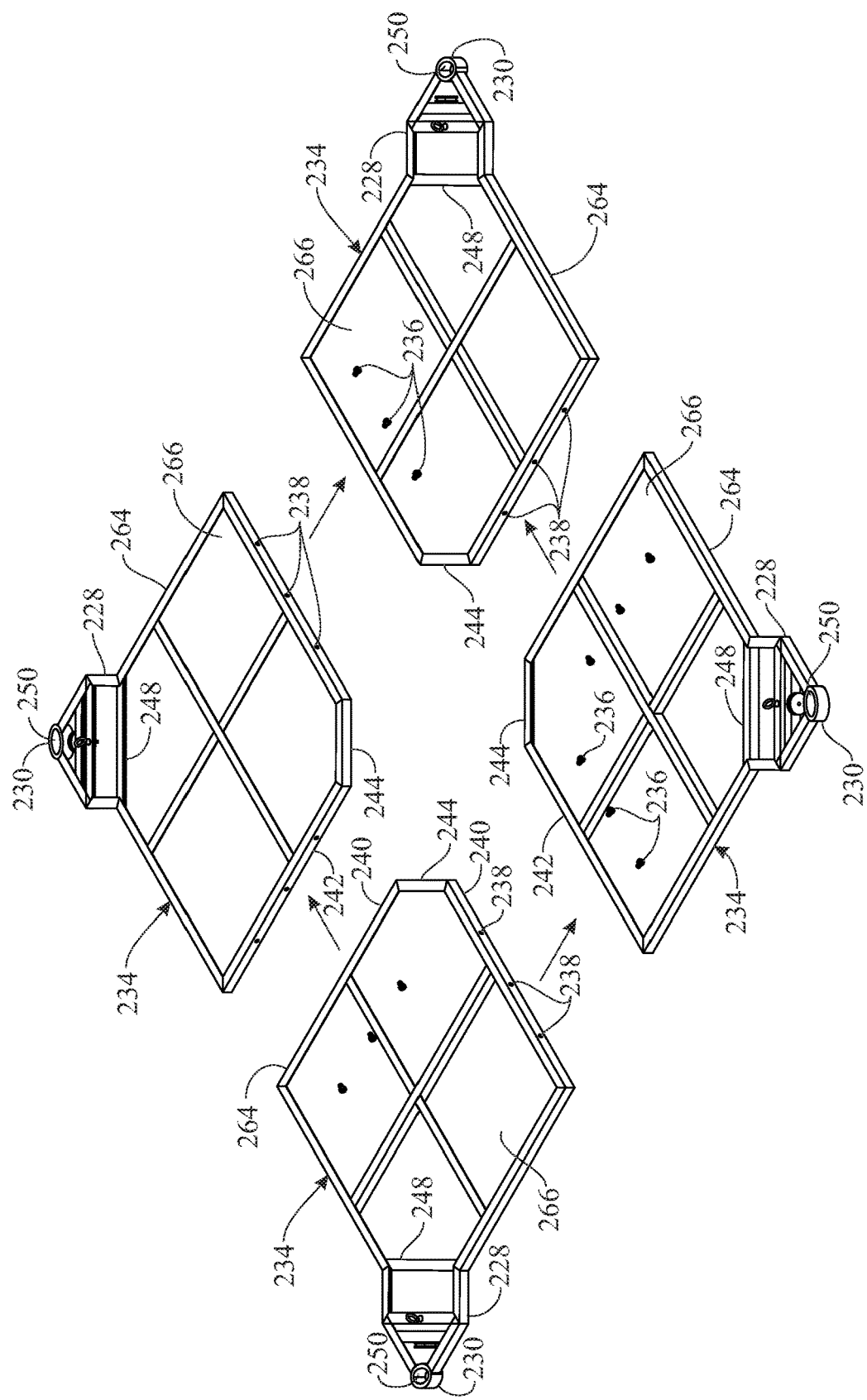
FIG. 18 presents an enlarged top isometric exploded view of the upper platform of the apparatus originally presented in FIG. 17.
Figure 21:
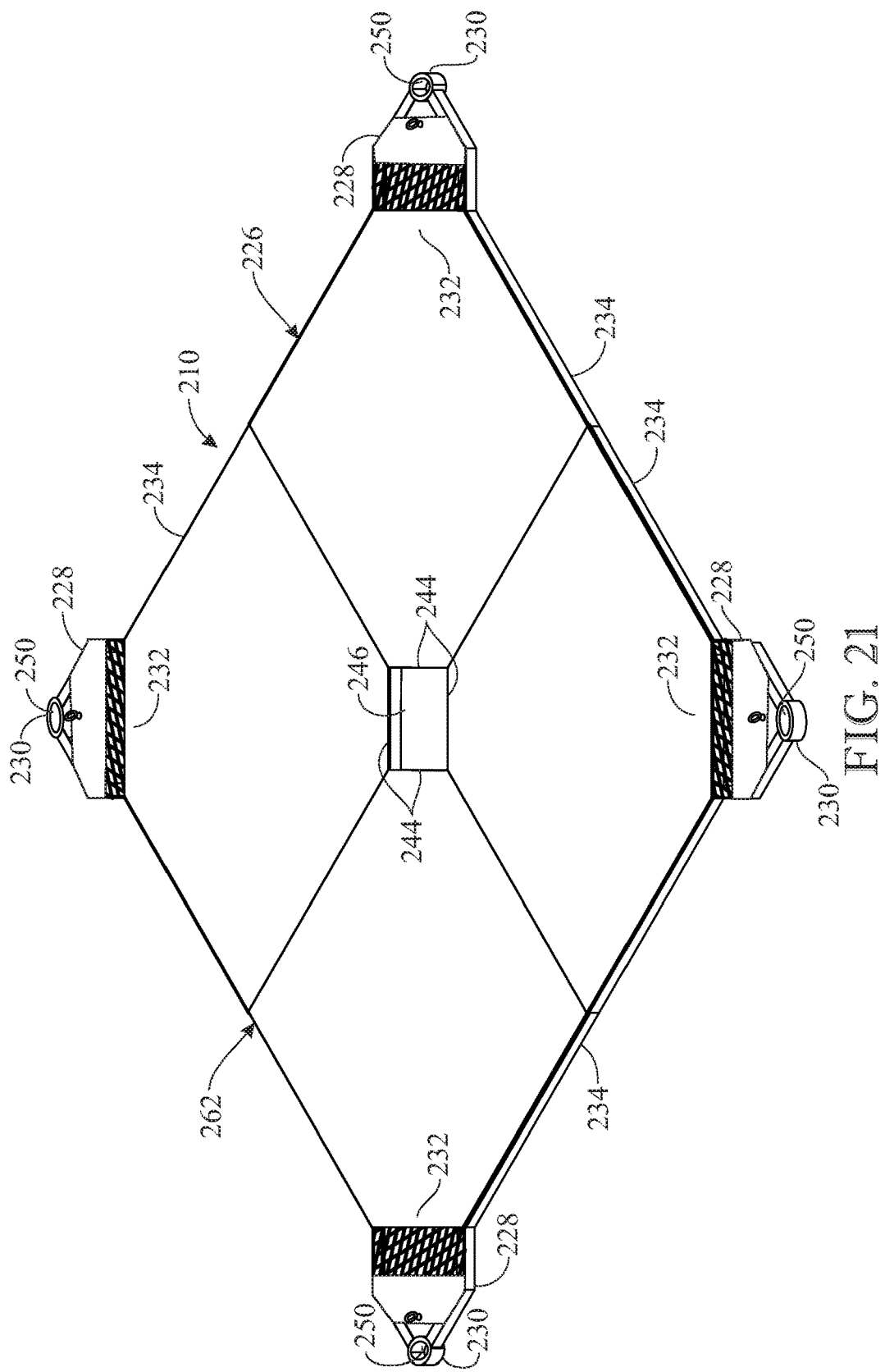
FIG. 21 presents an enlarged top isometric assembled view of a lower platform of the apparatus originally presented in FIG. 11.
Figure 22:
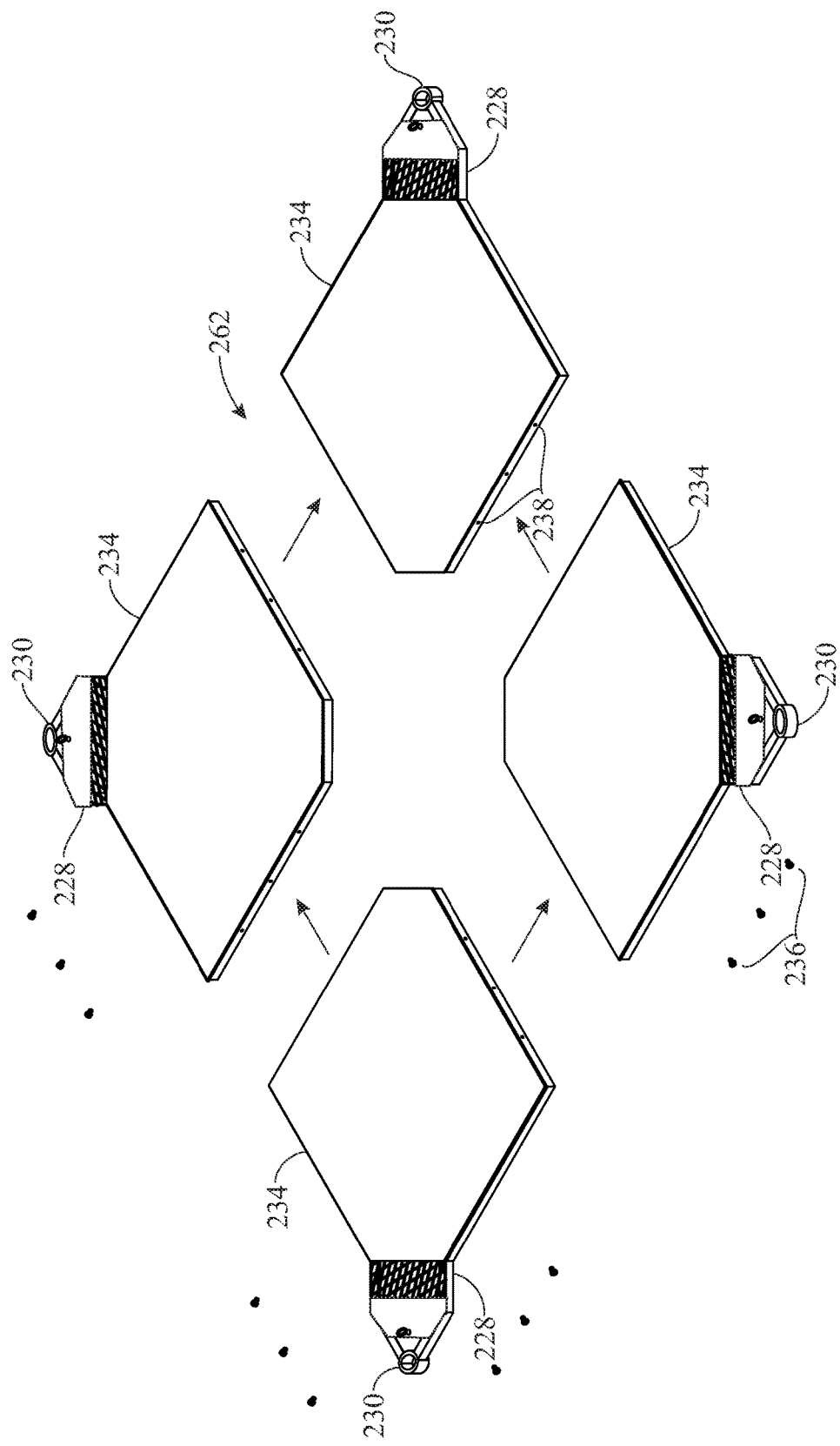
FIG. 22 presents an enlarged isometric exploded view of the lower platform of the apparatus originally presented in FIG. 21.
Figure 23:
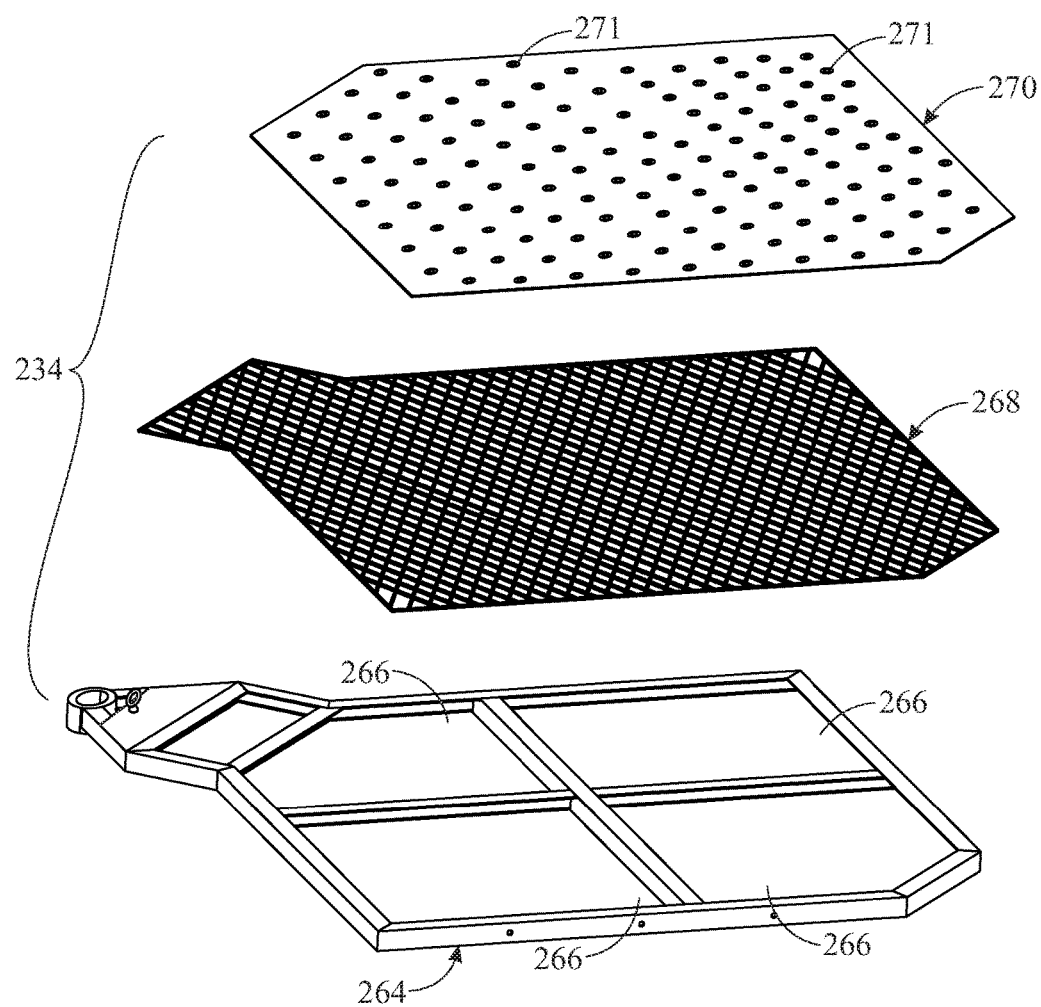
FIG. 23 presents a further enlarged isometric exploded view of a portion of the lower platform of the apparatus originally presented in FIG. 22.
Figure 24:
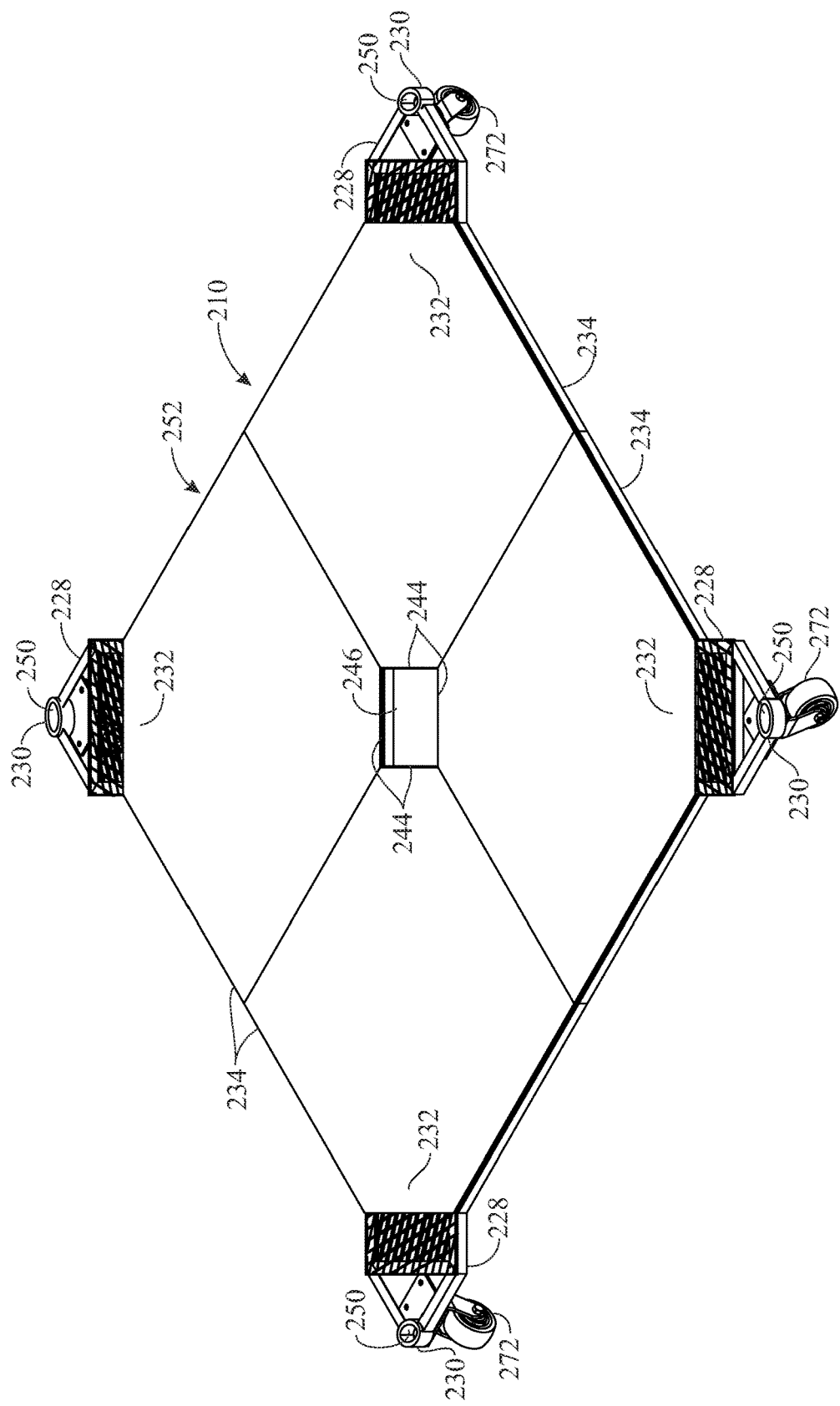
FIG. 24 presents an enlarged top isometric assembled view of a bottom platform of the apparatus originally presented in FIG. 11.
Figure 25:
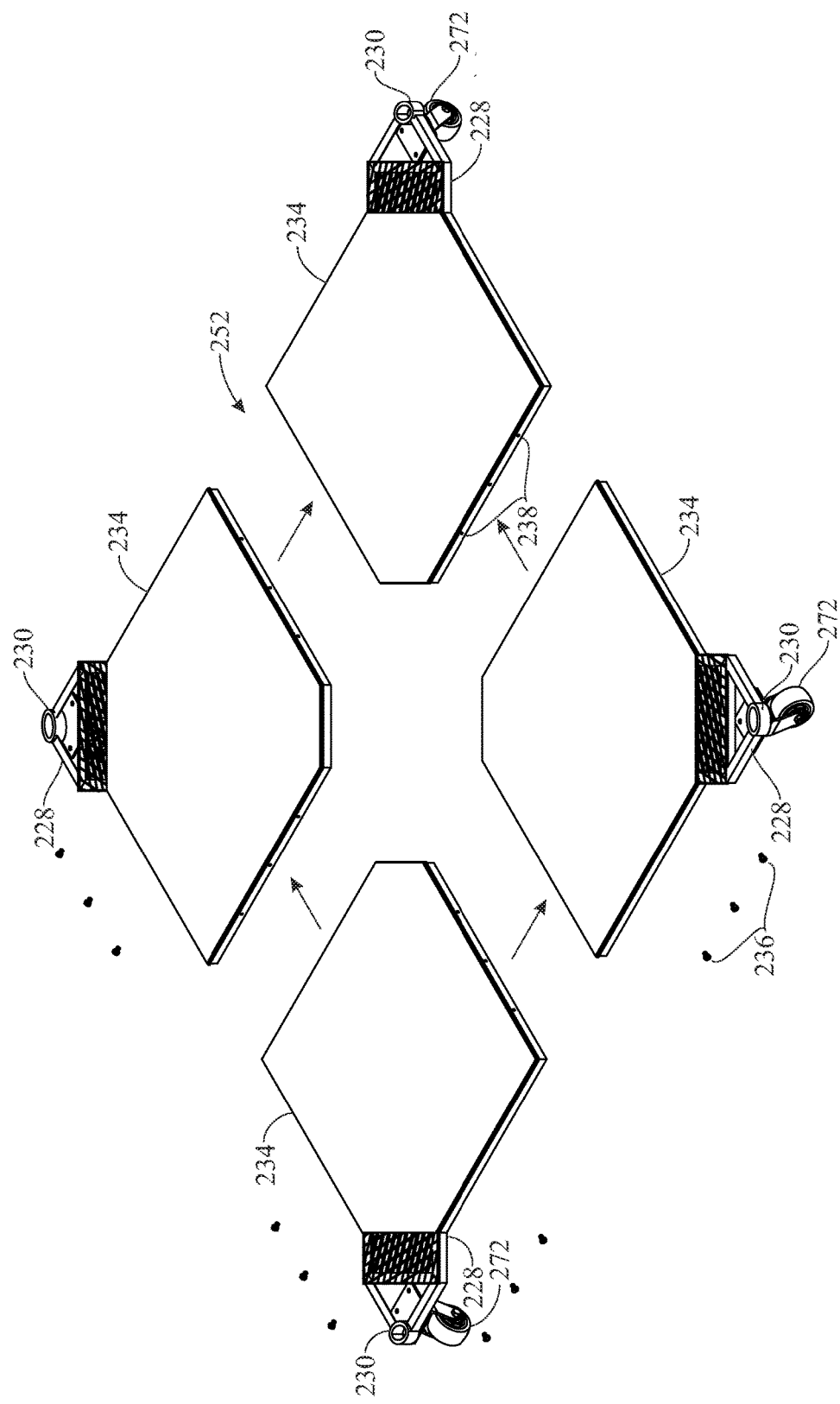
FIG. 25 presents an enlarged isometric exploded view of the bottom platform of the apparatus originally presented in FIG. 24.
Figure 26:
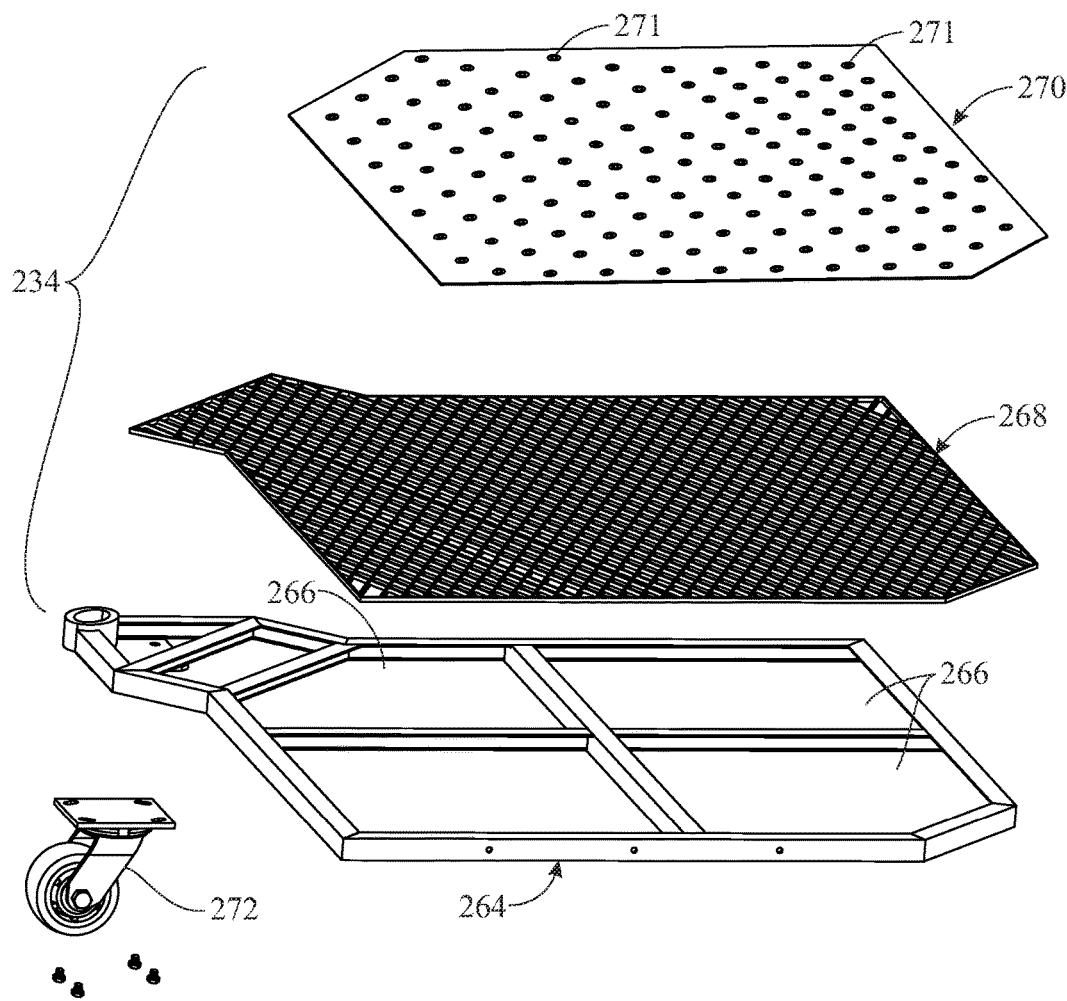
FIG. 26 presents a further enlarged isometric exploded view of a portion of the bottom platform of the apparatus originally presented in FIG. 25.

In addition to the plant growing apparatus 100, the plant growing system 174 may also include an array of light modules 176, an array of plant grow cells (or racks) 178, a water and nutrient reservoir 180, one or more pumps 182, a control board 184 and a user interface 186. The array of light modules 176, which may, by way of example but not limitation, be Light Emitting Diode (LED) light panels, are supported on the interior framework 148 of the top platform 110 so as to emit light in a downward direction. The array of plant grow cells 178, which may, by way of example but not limitation, be tray grow cells 188, as seen in FIGS. 5-7, or pyramidal grow cells 190, as seen in FIG. 8, are supported on the interior framework 156 and mesh 160 of the intermediate platform 112 below the light modules 176 so as to receive the light emitted by the light modules 176 disposed above the plant grow cells 178. The reservoir 180, the one or more pumps 182 and the control board 184 may be supported on the interior framework 138 and mesh 142 of the bottom platform 106. The one or more pumps 182 may include an air or pneumatic pump 192, a nutrient pump 194 and a pneumatic or hydraulic pump 196. A water supply line 198 extends respectively between the pump 192, the reservoir 180 and the array of plant grow cells 178. A nutrient supply line 200 extends respectively between the pump 194 and the plant grow cell array 178. The pump 196 communicates with the height control mechanisms 104, such as via wires 202 running through hollow interiors of the upright corner posts 108. By way of example but not limitation, a significant space, such as seven feet, may be provided between the top and intermediate platforms 110, 112 so as to enable the adjustment of the desired spacing therebetween to accommodate, for example, the various hardware supported upon the lower platform 106, the tray grow cells 188 on the intermediate platform 112, etc. Significantly, the platforms 106, 110, 112 are constructed to have very high load bearing capabilities, such as, by way of example but not limitation, loads of up to 2000 pounds or more, which enable application of the support assembly 102 for the growth of a wide variety of farm produce. Further, the reservoir 180 may, by way of example but not limitation, hold a purified, chilled, volume of water enhanced with 35% food grade hydrogen peroxide.

Referring to FIGS. 10-28, there is illustrated an alternate exemplary embodiment of a plant growing apparatus, generally designated 204, in accordance with aspects of the present invention. The plant growing apparatus 204 basically includes a support assembly 206 and a height control mechanism 208. The support assembly 206 includes a plurality of platforms 210, a plurality of elongated posts 212, and a plurality of support clips 216. The height control mechanism 208 includes a rotary power source 218, a support housing 220, a plurality of braces 222 and a drive transmission assembly 224.

More particularly, referring to FIGS. 10-14, 17, 18 and 21-29, each of the plurality of platforms 210 of the support assembly 206 includes a main platform portion 226, a plurality of extension portions 228 and a plurality of annular guides 230. The main platform portion 226 has a plurality of corners 232 spaced apart from one another about its periphery. The extension portions 228 are affixed to and protrude outwardly from the respective corners 232 of the main platform portion 226. The annular guides 230 are affixed to the extension portion 228 at locations spaced outwardly from the corners 232 of the main platform portion 226.

Excluding the top one of the platforms 210 seen only in FIGS. 10-14 and 27, each of the main platform portions 226 of the platforms 210 is assembled from a plurality of platform sections 234 affixed together by a plurality of pairs of matching threaded elements 236, 238, such as screws and threaded apertures of the platform sections. By fastening together the pairs of matching threaded elements 236, 238, two sides 240, 242 of each platform section 234 are affixed to the adjacent sides 240, 242 of the two adjacent platform sections 234. This fastened arrangement of the platform sections 234 to form each of the main platform portions 226 disposes an inner segment 244 of each platform section adjacent to the inner segments 244 of the other platform sections to define a central opening 246 in the main platform portion. This fastened arrangement of the platform sections 234 also disposes an outer segment 248 of each platform section diagonally across the platform section from, outwardly remote of and extending parallel to, the inner segment 244 of the platform section. The extension portions 228 are affixed to and protrude outwardly from the outer segments 248 of the main platform portion 226. The annular guides 230 are affixed to the extension portions 228 and spaced outwardly from the outer segment 248. Each annular guide 230 defines a passage 250 therethrough being oval in cross-sectional configuration.

Referring now to FIGS. 10, 11, 19, 20 and 27, each of the elongated posts 212 of the support assembly 206 may be of solid construction or of an extruded structural profile and oval in cross-sectional configuration. The elongated posts 212 are spaced apart from one another about the plurality of platforms 210. Also, the elongated posts 212 are disposed parallel to one another and extend vertically upright through the oval-shaped passages 250, and non-rotatable relative to respective ones, of the annular guides 230, affixed to the extension portions 228 of each of the platform 210. Such arrangement of the upright posts 212 vertically displaces and aligns the platforms 210 relative to one another along the elongated posts 212 such that plurality of platforms 210 define a bottom platform 252 supporting lower ends 254 of the elongated posts 212, a top platform 256 supported on upper ends 258 of the elongated posts 212, an upper platform 260 movable relative to the elongated posts 212 toward and away from upper ends 258 of the elongated posts 212, and a lower platform 262 spaced above the bottom platform 252 and below the top and upper platforms 256, 260. The upper and lower platforms 260, 262 are movable along the elongated posts 212 toward and away from each other and the bottom and top platforms 252, 256.

Furthermore, each of the platform sections 234 of the main platform portions 226 of the bottom, upper and lower platforms 252, 260, 262 includes a framework 264 defining an array of openings 266 through each platform section. Further, each of the platform sections 234 of the bottom and lower platforms 252, 262 may generally include a lattice structured platform 268 overlying the framework 164. It is also considered for the lattice structured platform 268 overlaying the framework to be covered by a flat solid sheet 270 or a flat sheet having a plurality of openings 271 (as particularly seen on FIGS. 23 and 26) in the event such a sheet is desired. The support assembly 206 further includes a plurality of caster wheel devices 272 spaced apart from one another and mounted to respective ones of the extension portions 228 of the bottom platform 252. The caster wheel devices 272 are disposed below the extension portions 228 and the annular guides 230 affixed thereto and spaced outwardly from the outer segment 248 of each platform 210 so as to mobilize the support assembly 206.

Referring now to FIGS. 10, 11, 19, 20 and 27-29, each elongated posts 212 may have a pair of grooves 274 extending along each of elongated posts 212 between the lower and upper ends 254, 258 thereof. Each groove 274 is formed into one of the pair of opposite arcuate edges 276 of each elongated post 212. Also, each of the elongated posts 212 has a plurality of apertures 278 formed therein at equal vertical spacing from one another along an outer side 280 of each elongated post and being spaced from the grooves 274 at the opposite arcuate edges 276 of each elongated post. Different sets of the apertures 278 in the elongated posts 212, being aligned with one another, are defined at different heights along the elongated posts.

Figure 27:
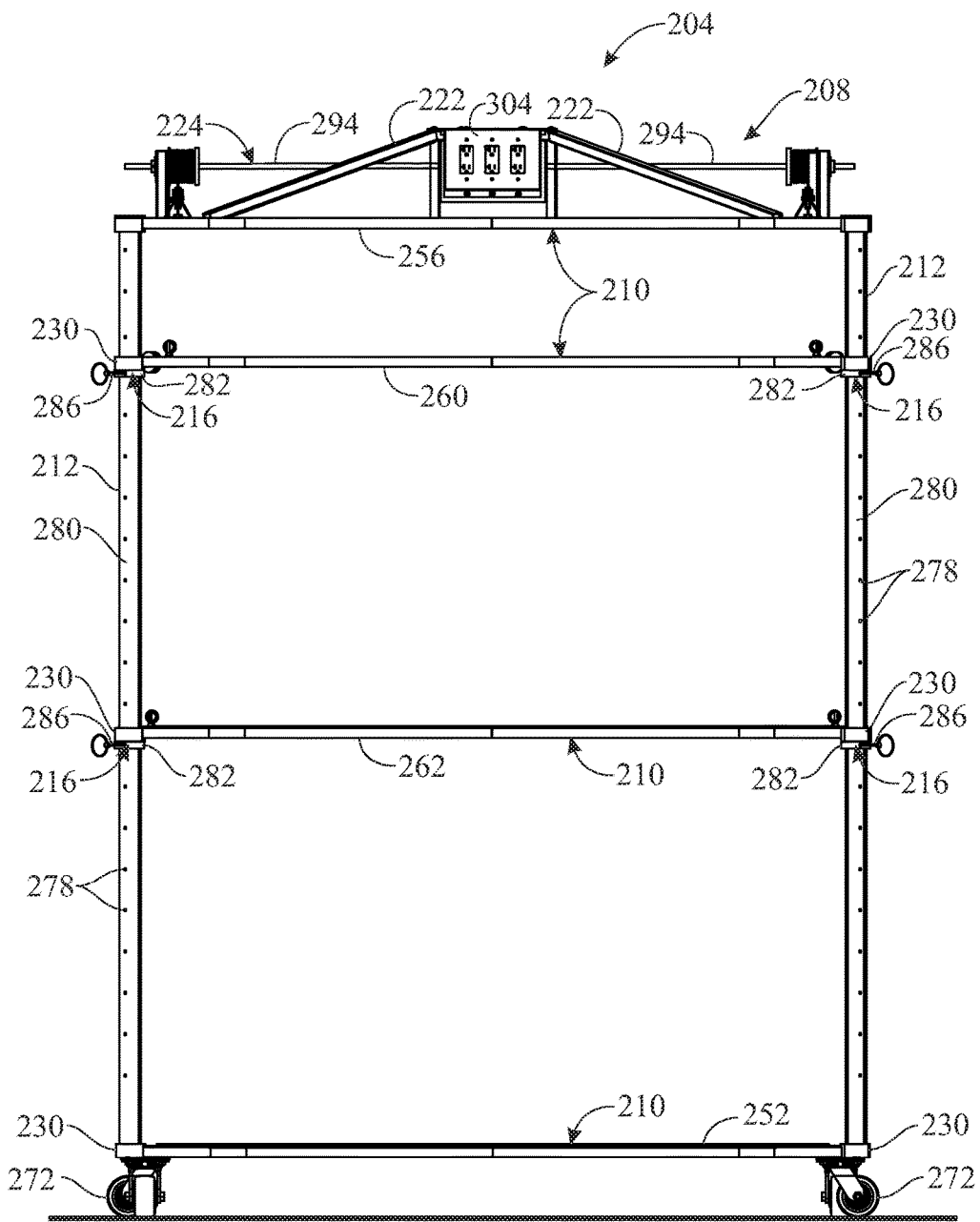
FIG. 27 presents an enlarged side elevational view of the apparatus originally presented in FIG. 10.
Figure 28:
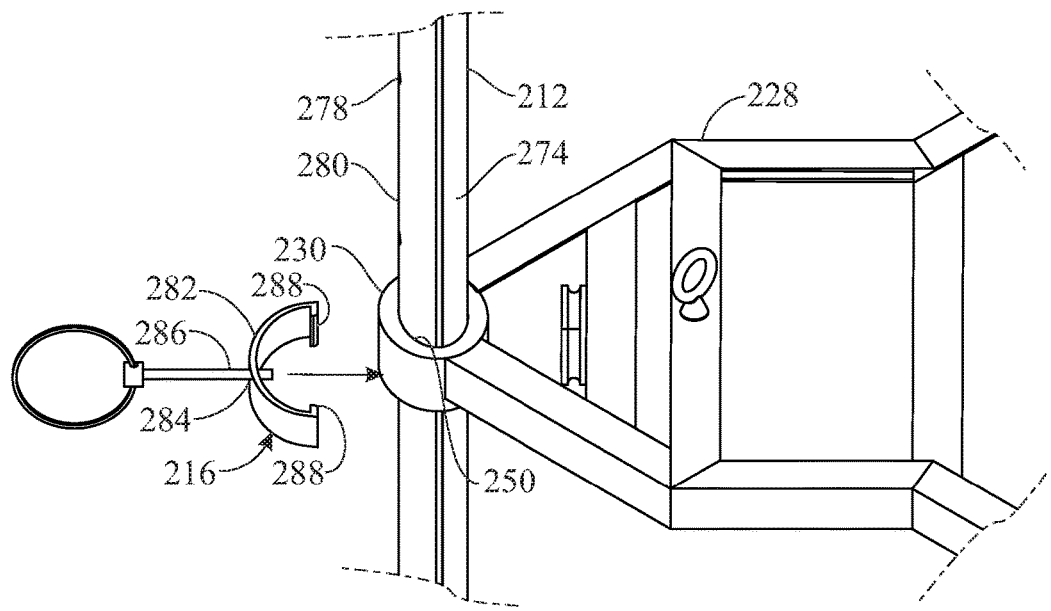
FIG. 28 presents an enlarged fragmentary top isometric view of one of the support clips of the apparatus shown disassembled from one of the elongated posts of the apparatus originally presented in FIG. 27.
Figure 29:
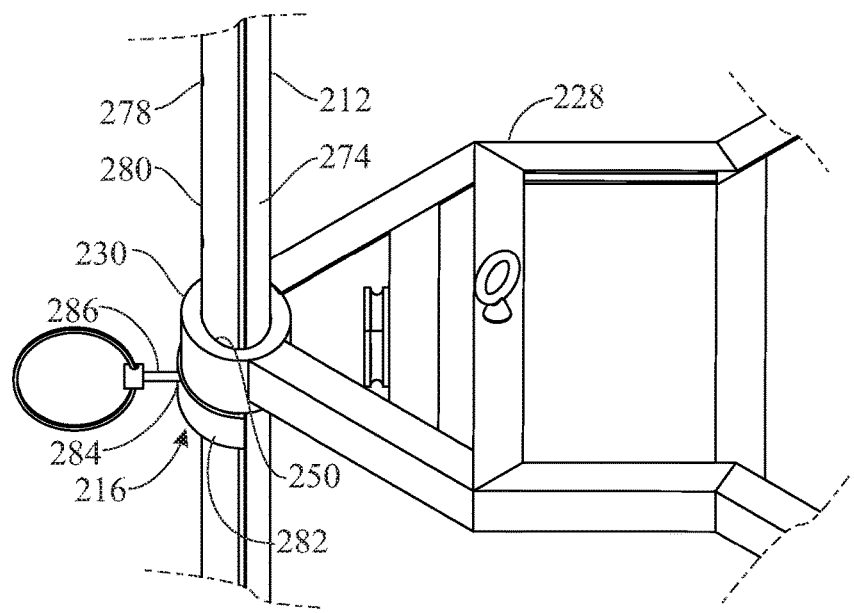
FIG. 29 presents an enlarged fragmentary top isometric view of the one support clip of the apparatus shown assembled to the one elongated post of the apparatus originally presented in FIG. 28.

As best seen in FIGS. 27-29, the plurality of support clips 216 of the support assembly 206 are selectively attachable to the elongated posts 212 so as to support the upper and lower platforms 260, 262 at different heights along the elongated posts above and relative to the bottom and top platforms 252, 256. Each of the support clips 216 has a band 282 of a resiliently yieldable construction and a configuration matching or conforming to the outer side 280 of a respective one of the elongated posts 212. Each support clip 216 also has a hole 284 is defined centrally through the band 282 and alignable with a selected one of the apertures 278 in the outer side 280 of the one elongated post 212, and a pin 286 insertable through the hole 284 in the band 282 and into a selected one of the apertures 278 of the one elongated post 212. Further, the band 282 of each support clip 216 has a pair of tabs 288 affixed on opposite ends of the band and projecting toward one another so as to fit into the pair of grooves 274 of the one elongated post 212 such that the band 282 of each support clip 216 is movable along the outer side 280 of the respective one elongated post to align the hole 284 of the band 282 with the selected one aperture 278 so that with the pin 286 inserted through the band hole 284 and into the selected one aperture 278 the support clip 216 underlies and supports a respective one of the upper and lower platforms 260, 262 at a selected height along the elongated posts 212.

The height control mechanism 208 of the plant growing apparatus 204 is mounted on and extends above the top platform 256 and is coupled to the upper platform 260 (below the top platform) at respective ones of the extension portions 228 at a diagonally opposite pair of the corners 232 of the upper platform 260 through interaction relative to a diagonally opposite pair of the corners 232 of the top platform 256 aligned above the corners 232 of the upper platform 260. With such arrangement, operation of the height control mechanism 208 selectively raises or lowers the upper platform 260 and the lower platform 262 therewith along the elongated posts 212 so as to minimize the potential for binding of the upper and lower platforms relative to the elongated posts. In the height control mechanism 208, the support housing 220, and thus the rotary power source 218 contained by the support housing, are centrally mounted on the top platform 256 by the plurality of braces 222 extending diagonally between and rigidly interconnecting the support housing and the corners 232 of the top platform. The drive transmission assembly 224 interconnects the rotary power source 218 with the diagonally opposite pair of corners 232 of the upper platform 260 such that selective operation of the rotary power source 218 correspondingly raises or lowers the upper platform 260, and the lower platform 262 therewith, along the elongated posts 212 relative to the stationary top platform 256.

More particularly, the drive transmission assembly 224 includes a pair of rotary spools 290, a pair of rotary pulleys 292, a pair of elongated drive shafts 294, and first and second pairs of cables 296, 298. The rotary spools 290 are mounted above the top platform 256 by upright support brackets 300 at a pair of locations in opposite directions from the rotary power source 218. The pair of rotary pulleys 292 are mounted above the diagonally opposite pair of corners 232 of the top platform 256 by inclined support brackets 302 such that each of the rotary pulleys 292 is aligned with one of the rotary spools 290. The elongated drive shafts 294 are coupled to and extend in opposite directions from the rotary power source 218 to respective ones of the rotary spools 290. The first pair of cables 296 each connected at a first end to one of the rotary spools 290 and connected at a second end to one of the diagonally opposite pair of corners 232 of the upper platform 260 such that actuation of the rotary power source 218 to rotate the pair of elongated drive shafts 294 in one or the other of opposite rotary directions cause the first pair of cables 296 to extend and retract away from and toward the rotary spools 290 resulting in the upper platform 260 being lowered and raised along the elongated posts 212 relative to the top platform 256, with the support clips 216 being removed. Concurrently, the lower platform 262 is lowered and raised with the upper platform 260 due to their interconnection by the second pair of cables 298.

In the various figures of the drawings, the configuration of the platforms 210 is generally illustrated in a square-shaped configuration. However, it should be understood that other configurations, such as rectangular, circular, pentagonal or, hexagonal configurations, are possible. Further, more platforms 210 may be added to the support assembly. Also, electrical power may be routed to the rotary power source, such as to an electric stepping motor or the like, from above the support housing. Electrical outlets 304 are also mounted by the support housing 220 for connecting to cords from light fixtures and the like. Although not shown, the height of the plant growing system 204 may be increased by mounting additional elongated posts of different lengths (e.g. 3 ft-6 ft) to each one of each respective elongated post 212. Each post may have a pair of J-channel grooves extending along each of elongated posts 212 between the lower and upper ends 254, 258 thereof. Further, the central openings 246 in the platforms 210 may be used to pass cables for fixtures or water pumps and the like.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A plant growing support assembly, comprising:
   a plurality of platforms, each of said platforms comprising
      a main platform portion formed by a plurality of platform sections,
      a plurality of pairs of matching threaded elements fastened together so as to affix two adjacent sides of each platform section to adjacent sides of two adjacent platform sections and dispose an inner segment of each platform section adjacent to inner segments of said other platform sections to define a central opening in said main platform portion and dispose an outer segment of each platform section diagonally across said each platform section from, outwardly and remote of, and extending parallel to, said inner segment of said platform section,
      a plurality of extension portions each affixed to and protruding outwardly from said outer segment of one of said platform sections of said main platform portion, and
      a plurality of annular guides each affixed to one of said extension portions and spaced outwardly from said outer segment of said each platform section, said each annular guide defining a passage therethrough;
   a plurality of elongated posts spaced apart from one another about said plurality of platforms, said elongated posts disposed parallel to one another and extending vertically upright through said passages of said annular guides affixed to said extension portions of said each platform so as to vertically displace and align said platforms relative to one another along said elongated posts and thereby said plurality of platforms defining a bottom platform supporting lower ends of said elongated posts, an upper platform movable relative to said elongated posts toward and away from upper ends of said elongated posts, and a lower platform spaced above said bottom platform and below said upper platform, said upper and lower platforms being movable along said elongated posts toward and away from each other and said bottom platform; and
   a plurality of support clips selectively attachable to said elongated posts so as to support said upper and lower platforms at different heights along said elongated posts above and relative to said bottom platform.

2. The support assembly of claim 1 further comprising a plurality of caster wheel devices being spaced apart from one another and mounted to respective ones of said extension portions of said bottom platform and below said extension portions and said annular guides affixed thereto spaced outwardly from said outer segment of said each platform so as to mobilize said support assembly.

3. The support assembly of claim 1 wherein said passage through each of said annular guides is oval in cross-sectional configuration.

4. The support assembly of claim 3 wherein each of said elongated posts is oval in cross-sectional configuration and non-rotatable relative to a respective one of said passages of said annular guides.

5. The support assembly of claim 1 wherein each of said elongated posts is of an extruded structural construction and has a pair of grooves extending along each of said elongated posts between upper and lower ends thereof, each groove being formed into one of a pair of opposite arcuate edges of said each elongated post.

6. The support assembly of claim 5 wherein each of said elongated posts also has a plurality of apertures formed therein at equal vertical spacing from one another along an outer side of said each elongated posts and being spaced from said grooves at said opposite arcuate edges of said each elongated post such that different sets of said apertures in said elongated posts, being aligned with one another, are defined at different heights along said elongated posts.

7. The support assembly of claim 6 wherein each of said support clips comprises:
   a band having a resiliently yieldable construction and a configuration matching said outer side of one of said elongated posts;
   a hole defined through said band and alignable with a selected one of said apertures in said outer side of said one elongated post;
   a pin insertable through said hole of said band and into one of said apertures in said outer side of said one elongated post; and
   a pair of tabs affixed on opposite ends of said band and projecting toward one another so as to fit into said pair of grooves of said one of said elongated posts such that said band of each support clip is movable along said outer side of said respective one of said elongated posts to align said hole of said band with a selected one of said apertures so that with said pin inserted through said hole of said band and into said selected one aperture said support clip supports a respective one of said top and intermediate platforms at a selected height along said elongated posts above and relative to said bottom platform.

8. The support assembly of claim 1 wherein each of said platform sections comprises a framework having a peripheral frame and an interior frame spanning between and rigidly affixed to said peripheral frame and defining said array of openings through said each platform section.

9. The support assembly of claim 8 wherein each of said platform sections of said bottom and intermediate platforms also comprises of a lattice structured platform overlying said framework of said each platform section.

10. A plant growing apparatus, comprising:
a plant growing support assembly comprising
a plurality of platforms, each of said platforms comprising
a main platform portion having a plurality of corners peripherally spaced apart from one another,
a plurality of extension portions each affixed to and protruding outwardly from one of said corners of said main platform portion, and
a plurality of annular guides each affixed to one of said extension portions and spaced outwardly from one of said corners of said main platform portion, said each annular guide defining a passage therethrough, and
a plurality of elongated posts spaced apart from one another about said plurality of platforms, said elongated posts disposed parallel to one another and extending vertically upright through said passages of said annular guides of said each platform so as to vertically displace and align said platforms relative to one another along said elongated posts and thereby said plurality of platforms defining a bottom platform supporting lower ends of said elongated posts, a top platform disposed on upper ends of said elongated posts, an upper platform spaced below said top platform and a lower platform spaced above said bottom platform and below said upper platform, said upper and lower platforms being movable along said elongated posts toward and away from each other and said top and bottom platforms; and
a height control mechanism mounted on and extending above said top platform and coupled to said upper platform at respective ones of said extension portions at a diagonally opposite pair of said corners of said upper platform through interaction relative to a diagonally opposite pair of said corners of said top platform aligned above said corners of said upper platform such that operation of said height control mechanism selectively raises or lowers said upper platform along said elongated posts.

11. The apparatus of claim 10 wherein said height control mechanism comprises:
a rotary power source;
a support receptacle centrally mounted on said top platform and containing said rotary power source;
a plurality of braces extending diagonally between and rigidly interconnecting said support receptacle and said corners of said top platform; and
a drive transmission assembly interconnecting said rotary power source with said diagonally opposite pair of corners of said upper platform such that selective operation of said rotary power source correspondingly raises or lowers said upper platform along said elongated posts relative to said stationary top platform.

12. The apparatus of claim 11 wherein said drive transmission assembly comprises:

a pair of rotary spools mounted above said top platform at a pair of locations in opposite directions from said rotary power source;
a pair of rotary pulleys mounted above said diagonally opposite pair of corners such that each of said rotary pulleys is aligned with one of said rotary spools;
a pair of elongated drive shafts coupled to and extending in opposite directions from said rotary power source to respective ones of said rotary spools; and
a pair of cables each connected at a first end to one of said rotary spools and connected at a second end to one of said diagonally opposite pair of corners of said upper platform such that actuation of said rotary power source to rotate said pair of elongated drive shafts in one or the other of opposite rotary directions cause said pair of cables to extend and retract away from and toward said rotary spools resulting in said upper platform being lowered and raised along said elongated posts relative to said top platform.

13. A plant growing apparatus, comprising:
a plant growing support assembly comprising
a plurality of platforms, each of said platforms comprising
a main platform portion formed by a plurality of platform sections,
a plurality of pairs of matching threaded elements fastened together so as to affix two sides of each of said platform sections to adjacent sides of two adjacent platform sections and dispose an inner segment of each platform section adjacent to inner segments of said other platform sections to define a central opening in said main platform portion and dispose an outer segment of each platform section diagonally across said each platform section rom, outwardly and remote of, and extending parallel to, said inner segment of said platform section,
a plurality of extension portions each affixed to and protruding outwardly from said outer segment of one of said platform sections of said main platform portion, and
a plurality of annular guides each affixed to one of said extension portions and spaced outwardly from said outer segment of one of said platform sections, said each annular guide defining a passage therethrough being oval in cross-sectional configuration,
a plurality of elongated posts each of extruded structural construction and oval in cross-sectional configuration and spaced apart from one another about said plurality of platforms, said elongated posts disposed parallel to one another and extending vertically upright through said passages, and non-rotatable relative to respective ones, of said annular guides affixed to said extension portions of said platforms so as to vertically displace and align said platforms relative to one another along said elongated posts and thereby said plurality of platforms defining a bottom platform supporting lower ends of said elongated posts, a top platform disposed on upper ends of said elongated posts, an upper platform spaced below said top platform and a lower platform spaced above said bottom platform and below said upper platform, said upper and lower platforms being movable along said elongated posts toward and away from each other and said top and bottom platforms, and a plurality of support clips selectively attachable to said elongated posts so as to support said upper and lower platforms at different heights along said elongated posts above and relative to said bottom platform; and a height control mechanism mounted on and extending above said top platform and coupled to said upper platform at respective ones of said extension portions at a diagonally opposite pair of said outer segments of said main platform portion such that operation of said height control mechanism selectively raises or lowers said upper platform along said elongated posts.

14. The apparatus of claim 13 further comprising a plurality of caster wheel devices being spaced apart from one another and mounted to respective ones of said extension portions of said bottom platform and below said extension portions and said annular guides affixed thereto spaced outwardly from said outer segment of said each platform so as to mobilize said support assembly.

15. The apparatus of claim 13 wherein each of said elongated posts is of a extruded structural construction and has a pair of grooves extending along each of said elongated posts between said upper and lower ends thereof, each groove being formed into one of a pair of opposite arcuate edges of said each elongated post.

16. The apparatus of claim 15 wherein said each of said elongated posts also has a plurality of apertures formed therein at equal vertical spacing from one another along an outer side of said each elongated posts and being spaced from said grooves at said opposite arcuate edges of said each elongated post such that different sets of said apertures in said elongated posts, being aligned with one another, are defined at different heights along said elongated posts.

17. The apparatus of claim 16 wherein said each of said support clips comprises:
 a band having a resiliently yieldable construction and a configuration matching said outer side of a respective one of said elongated posts;
 a hole defined through said band and alignable with a selected one of said apertures in said outer side of said one elongated post;
 a pin insertable through said hole of said band and into one of said apertures in said outer side of said one elongated post; and
 a pair of tabs affixed on opposite ends of said band and projecting toward one another so as to fit into said pair of grooves of said one elongated post such that said band of each support clip is movable along said outer side of said one elongated post to align said hole of said band with a selected one of said apertures so that with said pin inserted through said hole of said band and into said selected one aperture said clip supports a respective one of said top and intermediate platforms at a selected height along said elongated posts above and relative to said bottom platform.

18. The apparatus of claim 13 wherein said each of said platform sections of said bottom, lower and upper platforms comprises a framework defining an array of openings through said each platform section, and each of said platform sections of said bottom and lower platforms also comprises a lattice structured platform overlying said framework of said each platform section.

19. The apparatus of claim 13 wherein said height control mechanism comprises:
 a rotary power source;
 a support receptacle centrally mounted on said top platform and containing said rotary power source;
 a plurality of braces extending diagonally between and rigidly interconnecting said support receptacle and said corners of said top platform; and
 a drive transmission assembly interconnecting said rotary power source with said diagonally opposite pair of corners of said upper platform such that selective operation of said rotary power source correspondingly raises or lowers said upper platform along said posts relative to said stationary top platform.

20. The apparatus of claim 19 wherein said drive transmission assembly comprises:
 a pair of rotary spools mounted above said top platform at a pair of locations in opposite directions from said rotary power source;
 a pair of rotary pulleys mounted above said diagonally opposite pair of corners such that each of said rotary pulleys is aligned with one of said rotary spools;
 a pair of elongated drive shafts coupled to and extending in opposite directions from said rotary power source to respective ones of said rotary spools; and
 a pair of cables each connected at a first end to one of said rotary spools and connected at a second end to one of said diagonally opposite pair of corners of said upper platform such that actuation of said rotary power source to rotate said pair of elongated drive shafts in one or the other of opposite rotary directions cause said pair of cables to extend and retract away from and toward said rotary spools resulting in said upper platform being lowered and raised along said elongated posts relative to said top platform.

\* \* \* \* \*